US010586039B2

(12) United States Patent
Morizumi

(10) Patent No.: US 10,586,039 B2
(45) Date of Patent: Mar. 10, 2020

(54) INFORMATION PROCESSING APPARATUS

(71) Applicant: FUJITSU LIMITED, Kawasaki-shi, Kanagawa (JP)

(72) Inventor: Yoshihisa Morizumi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 48 days.

(21) Appl. No.: 16/111,694

(22) Filed: Aug. 24, 2018

(65) Prior Publication Data
US 2019/0073260 A1    Mar. 7, 2019

(30) Foreign Application Priority Data

Sep. 1, 2017  (JP) ................................. 2017-168720

(51) Int. Cl.
| G06F 21/52 | (2013.01) |
| H03M 13/29 | (2006.01) |
| G06F 11/10 | (2006.01) |
| H03M 13/09 | (2006.01) |
| G06F 12/16 | (2006.01) |

(52) U.S. Cl.
CPC .......... *G06F 21/52* (2013.01); *G06F 11/1004* (2013.01); *G06F 12/16* (2013.01); *H03M 13/09* (2013.01); *H03M 13/2906* (2013.01)

(58) Field of Classification Search
CPC combination set(s) only.
See application file for complete search history.

(56) References Cited

U.S. PATENT DOCUMENTS

| 4,722,052 A * | 1/1988 | Scheuneman ........... G06F 13/18 710/305 |
| 4,821,228 A * | 4/1989 | Wickes ............... G06F 11/1415 708/130 |
| 5,701,313 A * | 12/1997 | Purdham ............. G06F 11/1044 714/6.11 |
| 6,941,473 B2 * | 9/2005 | Etoh ..................... G06F 9/4486 726/5 |
| 7,380,245 B1 * | 5/2008 | Lovette ................ G06F 11/073 709/200 |
| 10,331,888 B1 * | 6/2019 | Gupta ................... G06F 11/073 |
| 10,496,462 B2 * | 12/2019 | Gschwind ........... G06F 11/0721 |

(Continued)

FOREIGN PATENT DOCUMENTS

| JP | 2001-216161 | 8/2001 |
| JP | 2010-198147 | 9/2010 |

*Primary Examiner* — Steve N Nguyen
(74) *Attorney, Agent, or Firm* — Fujitsu Patent Center

(57) ABSTRACT

An information processing apparatus includes a memory and a processor. The memory stores a first string of error detection codes each corresponding to a used partial area of a stack area allocated to a program. The processor generates, when execution of the program is interrupted, a differential string of error detection codes each corresponding to a used partial area of a difference between used partial areas at the time of generating the first string and used partial areas at the interruption. The processor obtains a second string of error detection codes by reflecting the differential string to the first string. The processor generates, when the execution of the program is resumed, a third string of error detection codes each corresponding to a used partial area of the stack area at the resumption. The processor detects stack destruction based on collation between the second string and the third string.

14 Claims, 16 Drawing Sheets

(56) References Cited

U.S. PATENT DOCUMENTS

2001/0013094 A1    8/2001    Etoh et al.
2015/0135181 A1*  5/2015    Porosanu ............ G06F 11/1004
                                                                             718/100

* cited by examiner

FIG. 10

| ENTRY NUMBER | ERROR DETECTION CODE | FRAME POINTER |
|---|---|---|
| n | code(n) | FPn |
| ... | ... | ... |
| 3 | code(3) | FP3 |
| 2 | code(2) | FP2 |
| 1 | code(1) | FP1 |

ERROR DETECTION CODE STORAGE TABLE — 150

UPPER ENTRY (POINT VALUE: SMALL)

LOWER ENTRY (POINT VALUE: LARGE)

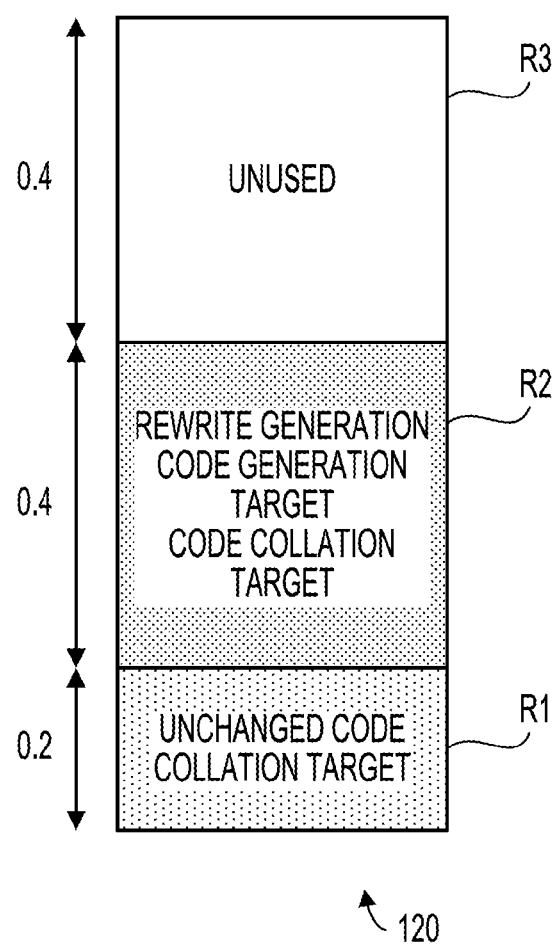 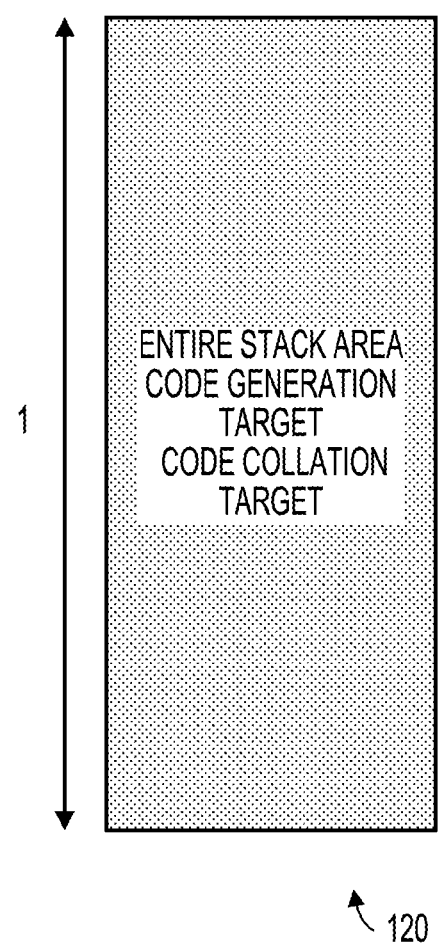

INFORMATION PROCESSING APPARATUS

CROSS-REFERENCE TO RELATED APPLICATION

This application is based upon and claims the benefit of priority of the prior Japanese Patent Application No. 2017-168720, filed on Sep. 1, 2017, the entire contents of which are incorporated herein by reference.

FIELD

The embodiments discussed herein are related to an information processing apparatus.

BACKGROUND

An area called a stack is set on a memory in order to execute a program by an information processing apparatus such as a computer. A storage area of the stack is allocated for each procedure, for example, when a program procedure (e.g., function) is called. A partial storage area of the stack allocated to one procedure may be called a stack frame. For example, arguments and local variables used for execution of procedures are stored in the stack frame.

Data stored in a stack may be destroyed by other programs, memory faults, or the like. Destruction of data stored in the stack may be the cause of malfunction of a program or an information processing apparatus that executes the program. Therefore, it is considered to detect abnormality of data stored in the stack area.

For example, there is a proposal for a computer which stores a hash value of data to be stored in a stack area in the stack area at the same time and uses the hash value to detect a data abnormality. In this proposal, when executing a program, a hash value recalculated from the data in the stack area is compared with the stored hash value and the data abnormality in the stack area is notified to the user when the two hash values are different from each other.

There is also a proposal to suppress a stack smashing attack caused by a buffer overflow on a stack by checking the validity of a guard variable stored between a preview frame pointer and an array of the stack in a return process of a function.

Related techniques are disclosed in, for example, Japanese Laid-Open Patent Publication Nos. 2010-198147 and 2001-216161.

SUMMARY

According to an aspect of the present invention, provided is an information processing apparatus including a memory and a processor coupled to the memory. The memory is configured to store a first string of error detection codes each corresponding to a used partial area of a stack area allocated to a program. The processor is configured to generate, when execution of the program is interrupted, a differential string of error detection codes each corresponding to a used partial area of a difference between used partial areas at the time of generating the first string of error detection codes and used partial areas at the interruption. The processor is configured to obtain a second string of error detection codes by reflecting the differential string of error detection codes to the first string of error detection codes stored in the memory. The processor is configured to generate, when the execution of the program is resumed, a third string of error detection codes each corresponding to a used partial area of the stack area at the resumption. The processor is configured to detect stack destruction based on collation between the second string of error detection codes and the third string of error detection codes.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 10 is a view illustrating an example of an error detection code storage table;

FIGS. 16A and 16B are views illustrating examples of an inspection target range.

DESCRIPTION OF EMBODIMENTS

In an information processing apparatus, execution of a certain program may be resumed after the execution of the program is interrupted (e.g., a case where a program to be executed is switched). The data in a stack area at the time of interruption of the interrupted program is maintained until the program is resumed. However, the data in the stack area may be destroyed by another program or the like during a period from the interruption to the resumption. Therefore, it is conceivable to make it possible to determine whether the stack area is destroyed at the resumption of the program.

For example, when interrupting the execution of the program, it is conceivable for the information processing apparatus to generate and store an error detection code for the entire stack area of the program. The information processing apparatus may regenerate the entire codes of the corresponding stack area at the time of resumption of the execution of the program and decide whether the stack area is destroyed by collating the regenerated codes with the stored code. However, this process for inspection becomes a factor of an overhead at the time of interruption of the execution of the program or resumption of the execution of the program.

Hereinafter, embodiments will be described with reference to the accompanying drawings.

First Embodiment

Figure 1:
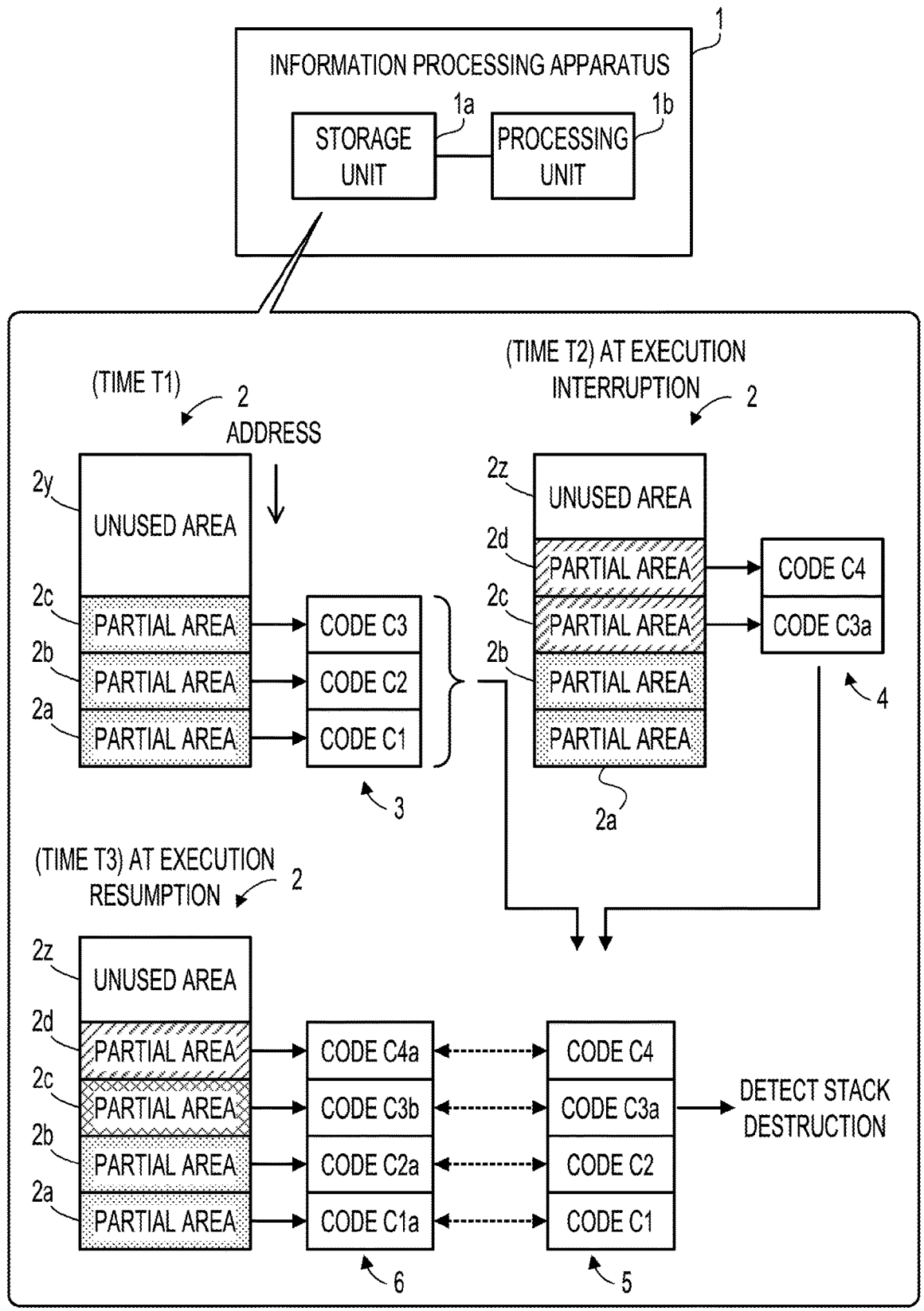
FIG. 1 is a view illustrating an information processing apparatus according to a first embodiment.

FIG. 1 is a view illustrating an information processing apparatus according to a first embodiment. An information processing apparatus 1 is a computer such as a server computer or a client computer that executes a program. The information processing apparatus 1 may interrupt the execution of a certain program and thereafter may resume the execution of the program. For example, while the execution of a certain program is interrupted, the information processing apparatus 1 executes another program. The information processing apparatus 1 provides an inspection function of inspecting the presence or absence of stack destruction occurring between the interruption of execution of the program and the resumption of execution of the program. "Stack destruction" indicates that data stored in a stack allocated to a program is altered by other programs, bit failure of a RAM, or the like.

The information processing apparatus 1 includes a storage unit 1a and a processing unit 1b. The storage unit 1a may be a volatile storage device such as a RAM (Random Access Memory) or a nonvolatile storage device such as an HDD (Hard Disk Drive) or a flash memory. The processing unit 1b is a processor that executes a program, such as a CPU (Central Processing Unit) or a microprocessor. A "processor" may include a set of multiprocessors.

The storage unit 1a has a stack area 2. The stack area 2 is a storage area corresponding to a stack allocated to a program to be executed. For example, in the information processing apparatus 1, plural programs are executed. The stack area 2 is set for each program.

The storage unit 1a stores an error detection code string generated for the stack area. The error detection code string is a set of one or more error detection codes. The error detection code is a code used for error detection in a predetermined area of the stack area. For example, a hash value, a cyclic redundancy check (CRC) value, or the like may be used as the error detection code.

Here, the error detection code is generated by the processing unit 1b for a used partial area in the stack area 2. The partial area of the stack area 2 is a portion of the stack area 2. The partial area of the stack area 2 is allocated for each procedure each time a program procedure (e.g., a subroutine, a function, a method, etc.) is called. The used partial area is a portion of the stack area 2 and has already been allocated to a certain procedure. The used partial area may be called a stack frame.

For example, at time T1, the stack area 2 has used partial areas 2a, 2b, and 2c and an unused area 2y. "Time" may be considered as a time range having a certain width including a time indicated by a clock. The storage unit 1a stores a first error detection code string 3 generated for the stack area 2 at time T1. The first error detection code string 3 includes error detection codes C1, C2, and C3 (abbreviated as a "code C1" in FIG. 1). The error detection code C1 is an error detection code generated for a partial area 2a at time T1. The error detection code C2 is an error detection code generated for a partial area 2b at time T1. The error detection code C3 is an error detection code generated for a partial area 2c at time T1. The first error detection code string 3 does not include an error detection code corresponding to the unused area 2y (an error detection code is not generated for the unused area 2y). An error detection code string to be stored for inspection is generated when the execution of the program is interrupted.

For example, time T1 is time at which execution of a program using the stack area 2 is interrupted. In this case, the first error detection code string 3 may be said to be an error detection code string acquired for a used partial area of the stack area 2 when the previous execution of the program is interrupted (at time T2 to be described later). Then, after time T1, before time T2 to be described later, the execution of the program using the stack area 2 is assumed to be resumed. However, time T1 may be a timing other than when the execution is interrupted. For example, time T1 may be a timing at which execution of the corresponding program is initially started. That is, the processing unit 1b may acquire the first error detection code string 3 at the timing at which execution of the corresponding program is initially started, and store the first error detection code string 3 in the storage unit 1a.

The processing unit 1b inspects whether there is stack destruction occurring between the execution interruption and the execution resumption of the program. Specifically, first, at the time of execution interruption of the program, the processing unit 1b generates a differential error detection code string for a difference between used partial areas in the stack area 2 at the time of acquisition of the first error detection code string 3 and at the time of current execution interruption.

For example, a case is assumed where execution of a program using the stack area 2 is interrupted at time T2. Time T2 is time later than time at which the execution of the program interrupted at time T1 is resumed.

At time T2, the stack area 2 includes used partial areas 2a, 2b, 2c, and 2d and an unused area 2z. The processing unit 1b generates a differential error detection code string 4 for the stack area 2 at time T2 and stores the differential error detection code string 4 in the storage unit 1a. The differential error detection code string 4 is generated for a difference between the used partial areas 2a, 2b, and 2c at the time of acquisition of the first error detection code string 3 (time T1) and the used partial areas 2a, 2b, 2c, and 2d at the time of current execution interruption of the program (time T2). When the execution of the corresponding program is interrupted at time T1, the processing unit 1b may inspect the stack destruction using the first error detection code string 3 even when the execution of the program is resumed before time T2 after time T1 (it is assumed that since the stack destruction is not detected, the execution of the program is normally resumed). In this case, it may be said that the difference between the partial areas is a difference for the previous inspection.

For example, the partial area 2d is an area that is a portion of the unused area 2y at time T1, and corresponds to the difference between the used partial areas 2a, 2b, and 2c at time T1 and the used partial areas 2a, 2b, 2c, and 2d at time T2. In addition, data stored in the partial area 2c at time T2 is different from data stored in the partial area 2c at time T1. Therefore, the partial area 2c at time T2 corresponds to the difference between the used partial areas 2a, 2b, and 2c at time T1 and the used partial areas 2a, 2b, 2c, and 2d at time T2. In the meantime, the used partial areas 2a and 2b at time T1 and the used partial areas 2a and 2b at time T2 have the same stored data. Therefore, the partial areas 2a and 2b at time T2 do not correspond to the difference between the used partial areas 2a, 2b, and 2c at time T1 and the used partial areas 2a, 2b, 2c, and 2d at time T2.

The processing unit 1*b* may determine a difference in data for each partial area between time T1 and time T2, for example, depending on whether the error detection code at time T1 is different from the error detection code at time T2. A difference between the error detection code generated at time T2 and the error detection code at time T1 means a data difference. A match between the error detection code generated at time T2 and the error detection code at time T1 means a data match.

In this case, due to the characteristics of the growth direction and LIFO (Last In/First Out) of used areas of a stack for addresses of the storage unit 1*a*, the processing unit 1*b* may determine the data difference for each partial area between time T1 and time T2 without generating error detection codes for all the partial areas. Specifically, the stack grows from the maximum address to the minimum address in an allocated address range. In addition, the used partial areas are released from the newer one in order according to a nest structure of the call relationship between procedures included in a program. Here, the head address of a used area in the stack area 2 is indicated by a register called a stack pointer. Further, for example, a pointer indicating a predetermined address in an immediately preceding partial area (e.g., the head address in an immediately preceding partial area) is included at a predetermined position of a used partial area. The processing unit 1*b* determines each partial area in the storage unit 1*a* based on this pointer.

At time T2, the processing unit 1*b* sequentially generates error detection codes one by one from a partial area having the smaller address and collates the generated error detection codes with the error detection code at time T1 every partial area. For a partial area allocated with an address larger than the address of a partial area in which the error detection code generated at time T2 and the error detection code at time T1 first match each other, the processing unit 1*b* may regard that data at T1 matches data at T2 due to the characteristics of the stack.

In the example of FIG. 1, the addresses become smaller in order of the partial areas 2*a*, 2*b*, 2*c*, and 2*d*. In this case, for example, the processing unit 1*b* generates an error detection code C3*a* for the partial area 2*c* and compares the error detection code C3*a* with the error detection code C3. Since both are different from each other, the processing unit 1*b* determines that the partial area 2*c* is a differential partial area. Next, the processing unit 1*b* generates an error detection code for the partial area 2*b* and compares the generated error detection code with the error detection code C2. Since both match each other, the processing unit 1*b* does not regard the partial area 2*b* as a differential partial area. In this case, the processing unit 1*b* does not regard the partial area 2*a* as a differential partial area as well. The processing unit 1*b* may not generate an error detection code for the partial area 2*a* at time T2. The processing unit 1*b* generates an error detection code C4 for the partial area 2*d*. The processing unit 1*b* sets the error detection codes C3*a* and C4 as a differential error detection code string 4.

A method of determining a difference between partial areas using an error detection code has been illustrated in the above example, but other determination methods are also conceivable. For example, the storage unit 1*a* may store a flag indicating the presence or absence of update for each partial area. For example, the flag is set to "FALSE" at the time of previous interruption (or at the time of previous resumption) and, when there is an update of a corresponding partial area during execution of a program, is changed to "TRUE" by this program. Based on the flag stored in the storage unit 1*a*, the processing unit 1*b* may determine a difference between partial areas at time T2. In this case, the processing unit 1*b* may not generate error detection codes for both of the partial areas 2*a* and 2*b* at time T2.

The processing unit 1*b* acquires a second error detection code string 5 which reflects the differential error detection code string 4 in the first error detection code string 3 stored in the storage unit 1*a*, and stores the acquired second error detection code string 5 in the storage unit 1*a*. The processing unit 1*b* may obtain the second error detection code string 5 by applying the differential error detection code string 4 to the first error detection code string 3 (e.g., by updating an updated portion and adding an added portion).

The second error detection code string 5 includes the error detection codes C1, C2, C3*a*, and C4. The error detection code C1 is an error detection code corresponding to the partial area 2*a* at time T2 (and at time T1). The error detection code C2 is an error detection code corresponding to the partial area 2*b* at time T2 (and time T1). The error detection code C3*a* is an error detection code corresponding to the partial area 2*c* at time T2. The error detection code C4 is an error detection code corresponding to the partial area 2*d* at time T2. The second error detection code string 5 does not include an error detection code corresponding to the unused area 2*z*.

When the execution of the program is resumed, the processing unit 1*b* detects stack destruction according to collation between the second error detection code string 5 and a third error detection code string 6 newly generated for a used partial area at the time of execution resumption.

For example, a case is assumed where execution of a program interrupted at time T2 is resumed at time T3 (a case where an attempt is made to resume execution). Time T3 is time later than time T2. Time T3 may also be said to be immediately before resumption of execution of the program interrupted at time T2.

At time T3, the stack area 2 has the used partial areas 2*a*, 2*b*, 2*c*, and 2*d* and the unused area 2*z*. The processing unit 1*b* generates a third error detection code string 6 for the stack area 2 at time T3 and stores the third error detection code string 6 in the storage unit 1*a*. The third error detection code string 6 includes error detection codes C1*a*, C2*a*, C3*b*, and C4*a*. The error detection code C1*a* is an error detection code generated for the partial area 2*a* at time T3. The error detection code C2*a* is an error detection code generated for the partial area 2*b* at time T3. The error detection code C3*b* is an error detection code generated for the partial area 2*c* at time T3. The error detection code C4*a* is an error detection code generated for the partial area 2*d* at time T3. The third error detection code string 6 does not include an error detection code corresponding to the unused area 2*z*.

The processing unit 1*b* collates the second error detection code string 5 with the third error detection code string 6. Here, the processing unit 1*b* may acquire the second error detection code string 5 before time T3 or acquire the second error detection code string 5 immediately before the collation at time T3.

For example, the processing unit 1*b* collates the error detection code C1 corresponding to the partial area 2*a* at time T2 (and time T1) with the error detection code C1*a* corresponding to the partial area 2*a* at time T3. It is assumed that the error detection codes C1 and C1*a* match each other. In this case, the processing unit 1*b* determines that stack destruction has not occurred in the partial area 2*a*.

The processing unit 1*b* collates the error detection code C2 corresponding to the partial area 2*b* at time T2 (and time T1) with the error detection code C2*a* corresponding to the partial area 2*b* at time T3. It is assumed that the error detection codes C2 and C2a match each other. In this case, the processing unit 1b determines that stack destruction has not occurred in the partial area 2b.

The processing unit 1b collates the error detection code C3a corresponding to the partial area 2c at time T2 with the error detection code C3b corresponding to the partial area 2c at time T3. It is assumed that the error detection codes C3a and C3b are different from each other. In this case, the processing unit 1b determines that stack destruction has occurred in the partial area 2c.

The processing unit 1b collates the error detection code C4 corresponding to the partial area 2d at time T2 with the error detection code C4a corresponding to the partial area 2d at time T3. It is assumed that the error detection codes C4 and C4a match each other. In this case, the processing unit 1b determines that stack destruction has not occurred in the partial area 2d.

In the above example, since the processing unit 1b detects the stack destruction for the partial area 2c, the processing unit 1b notifies a user that the stack destruction has occurred (the resumption of execution of the program is put off). The processing unit 1b may notify the user of information on the partial area 2c in which the stack destruction is detected (e.g., an address, etc.). Thus, by resuming the program in a state in which the stack destruction has occurred, it is possible to suppress the program or the information processing apparatus 1 from malfunctioning.

When no stack destruction is detected for the partial areas 2a, 2b, 2c and 2d, the processing unit 1b resumes execution of the corresponding program. According to the information processing apparatus 1, it is possible to reduce the amount of processing for inspection of the stack destruction. Specifically, at time T3, the processing unit 1b takes the used partial areas 2a, 2b, 2c, and 2d in the stack area 2 as inspection targets for stack destruction and does not take the unused area 2z as an inspection target of stack destruction. Therefore, it is possible to reduce the amount of processing for generating and collating error detection codes, rather than generating and collating error detection codes for the entire stack areas 2.

Particularly, at the time of interruption of execution of the program (time T2), the processing unit 1b generates the differential error detection code string 4 for the differential partial areas 2c and 2d with respect to the partial areas which are the previous inspection target (the partial areas 2a, 2b, and 2c for which the error detection codes have been generated). Then, the processing unit 1b obtains the second error detection code string 5 by reflecting the differential error detection code string 4 in the existing first error detection code string 3. At this time, the processing unit 1b may not generate an error detection code for both partial areas 2a and 2b or for the partial area 2a. Therefore, at time T2, the amount of processing for generating an error detection code may be reduced, rather than generating error detection codes for all of the used partial areas 2a, 2b, 2c, and 2d.

In this manner, the information processing apparatus 1 may reduce the amount of processing of generation and collation of an error detection code, which is performed for inspection of stack destruction at the time of execution interruption and execution resumption of the program. As a result, it is possible to reduce the overhead (processing load) in interrupting and resuming the execution of the program and speed up the execution interruption and execution resumption. Therefore, for example, it is possible to speed up the switching of the program to be executed in the information processing apparatus 1.

Hereinafter, the functions of the information processing apparatus 1 will be described in more detail with a specific server computer (hereinafter, simply referred to as a server) as an example of the information processing apparatus 1.

Second Embodiment

Figure 2:
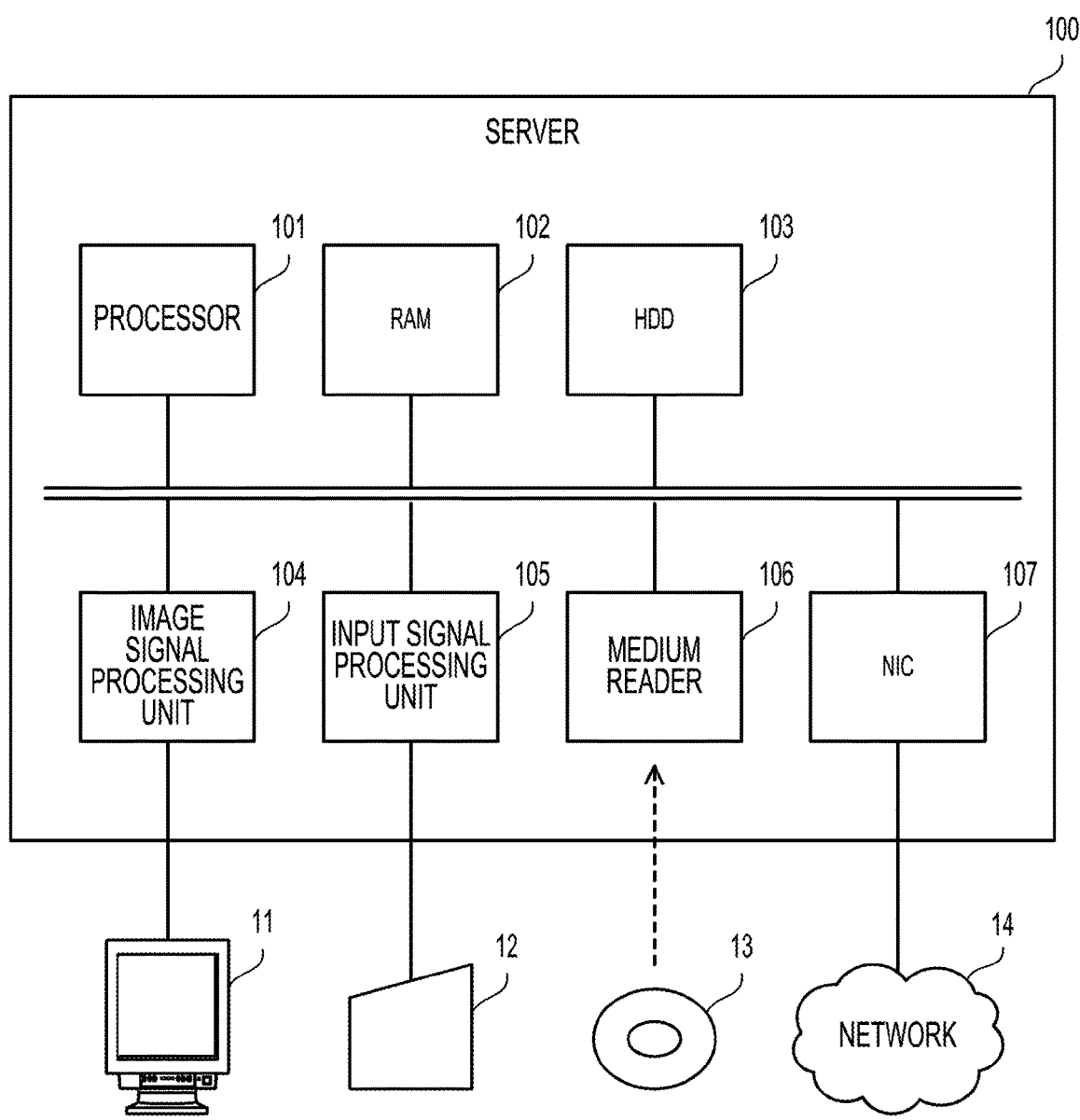
FIG. 2 is a view illustrating a hardware example of a server according to a second embodiment.

FIG. 2 is a view illustrating a hardware example of a server according to a second embodiment. The server 100 includes a processor 101, a RAM 102, an HDD 103, an image signal processing unit 104, an input signal processing unit 105, a medium reader 106, and an NIC (Network Interface Card) 107, which are connected to a bus of the server 100.

The processor 101 is hardware that controls information processing of the server 100. The processor 101 may be a multiprocessor. The processor 101 is, for example, a CPU or a microprocessor.

The RAM 102 is a main storage device (main memory) of the server 100. The RAM 102 temporarily stores at least a part of an OS (Operating System) program and application programs to be executed by the processor 101. Further, the RAM 102 stores various data to be used for processing by the processor 101.

The HDD 103 is an auxiliary storage device of the server 100. The HDD 103 magnetically writes and reads data in and from a built-in magnetic disk. The HDD 103 stores an OS program, application programs, and various data. The server 100 may include other types of auxiliary storage devices such as a flash memory and an SSD (Solid State Drive), or may include plural auxiliary storage devices.

The image signal processing unit 104 outputs an image to a display 11 connected to the server 100 according to a command from the processor 101. As the display 11, a CRT (Cathode Ray Tube) display, a liquid crystal display, or the like may be used.

The input signal processing unit 105 acquires an input signal from an input device 12 connected to the server 100 and outputs the input signal to the processor 101. As the input device 12, for example, a pointing device such as a mouse or a touch panel, a keyboard, or the like may be used.

The medium reader 106 is a device that reads programs and data recorded on the recording medium 13. As the recording medium 13, for example, a magnetic disk such as a flexible disk (FD) or an HDD, an optical disk such as a CD (Compact Disc) or a DVD (Digital Versatile Disc), or a magneto-optical disk (MO) may be used. Further, as the recording medium 13, for example, a nonvolatile semiconductor memory such as a flash memory card may be used. The medium reader 106 stores programs and data read from the recording medium 13 in the RAM 102 or the HDD 103 according to a command from the processor 101.

The NIC 107 communicates with other devices via a network 14. The NIC 107 may be either a wired communication interface or a wireless communication interface. Here, the OS of the server 100 manages the execution unit of the program in units called tasks. A task is sometimes called a process. The OS of the server 100 is a multitasking OS. The server 100 switches and executes each of plural tasks by context switching by the function of the OS. The switching timing is controlled by the OS.

Figure 3:
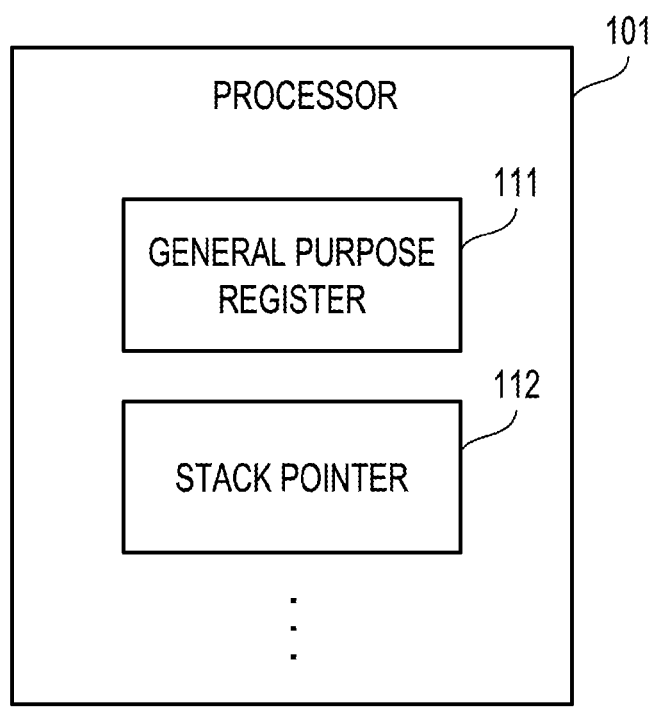
FIG. 3 is a view illustrating a register example in a processor.

FIG. 3 is a view illustrating an example of registers in the processor. The processor 101 includes a general purpose register 111 and a stack pointer 112. The general purpose register 111 is a register which may be used for general purpose, such as an accumulator, a base register, a count register, and a data register. The stack pointer 112 is a register indicating the head address in a used area of a stack of the RAM 102. The processor 101 includes other various registers in addition to these registers.

Figure 4:
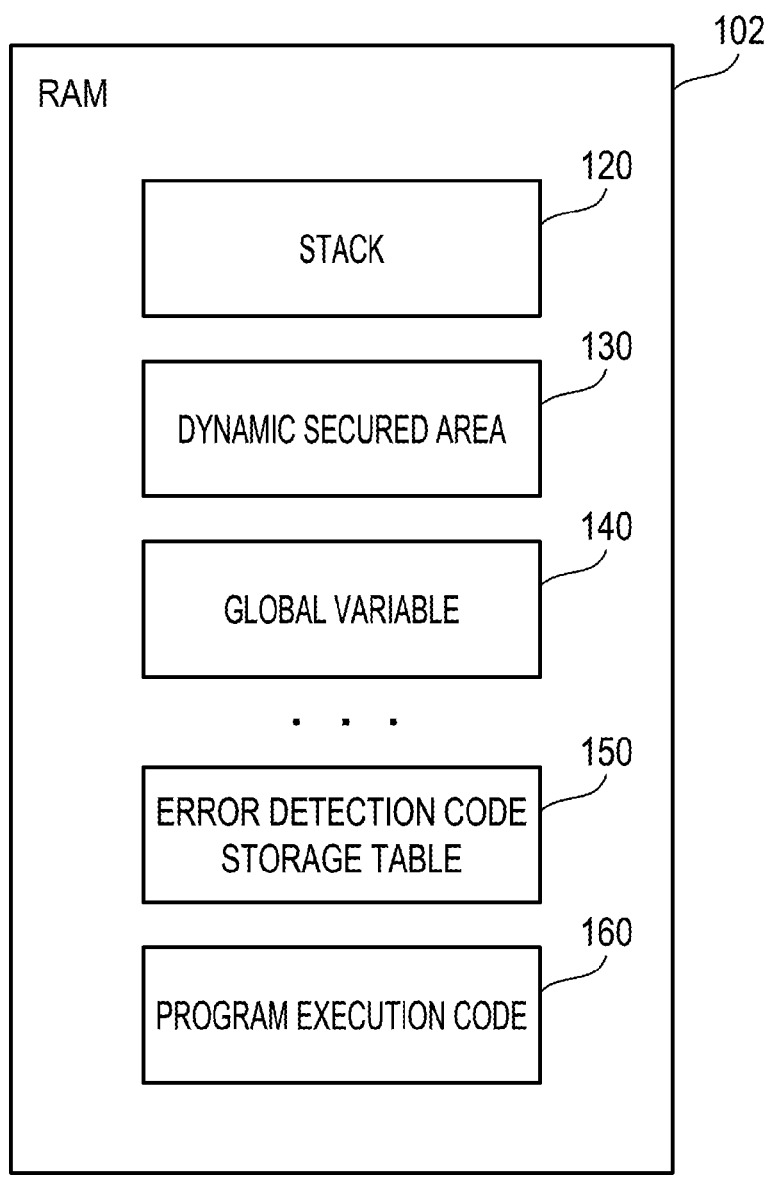
FIG. 4 is a view illustrating an example of a storage area of a RAM.

FIG. 4 is a view illustrating an example of a storage area of the RAM. The RAM 102 includes a stack 120, a dynamic secured area 130, a global variable 140, an error detection code storage table 150, and a program execution code 160.

The stack 120 stores arguments and local variables of a function in a task. The stack 120 is allocated for each task to be executed. A partial area of the stack 120 is allocated for each called function. A partial area allocated to one function is called a stack frame.

The dynamical secured area 130 is an area that may be secured dynamically in order to store various data to be used for program processing. The global variable 140 is a variable accessible from all functions.

The error detection code storage table 150 is a table that stores error detection codes to be used for inspection of stack destruction. The error detection codes are, for example, hash values or CRC values. The program execution code 160 is an execution image of various programs.

Figure 5:
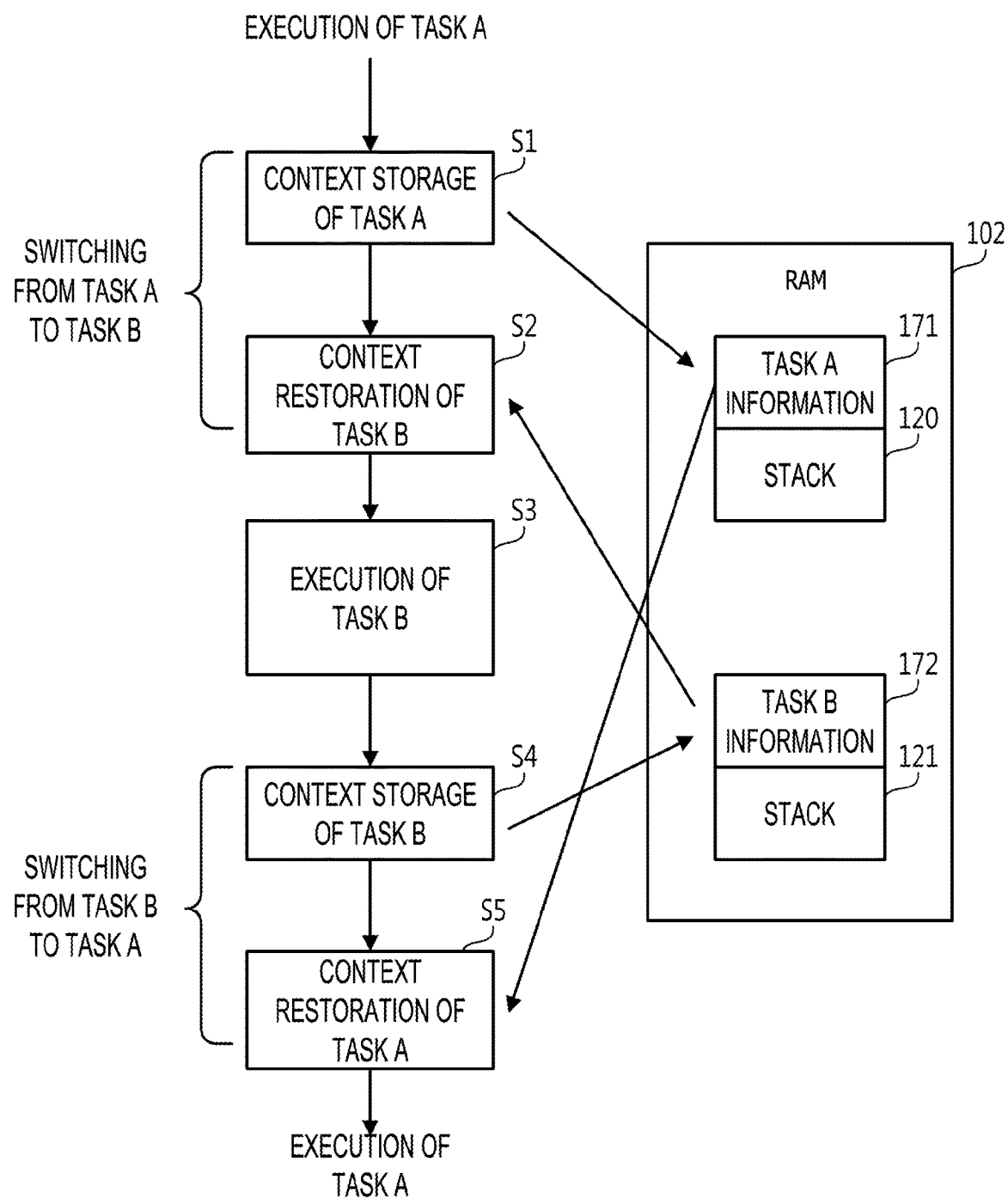
FIG. 5 is a view illustrating an example of task switching.

Various data other than those illustrated in FIG. 4 may be stored in the RAM 102. FIG. 5 is a view illustrating an example of task switching. As an example, a case where two tasks A and B are switched and executed in order is illustrated in FIG. 5. However, the server 100 may switch and execute three or more tasks. Here, it is assumed that a stack 120 is a stack on the RAM 102 allocated to the task A. It is assumed that a stack 121 is a stack on the RAM 102 allocated to the task B.

First, the processor 101 executes the task A. At a timing of switching from the task A to the task B, the processor 101 stores the context of the task A. The context of the task A is register information of the processor 101 immediately before switching of the task A. The processor 101 stores the context of the task A in the RAM 102 as task A information 171 (S1).

The processor 101 restores the context of the task B based on task B information 172 stored in the RAM 102 (S2). The processor 101 resumes the execution of the task B based on the restored context (S3).

At a timing of switching from the task B to the task A, the processor 101 stores the context of the task B in the RAM 102 as the task B information 172 (S4).

The processor 101 restores the context of the task A based on the task A information 171 stored in the RAM 102 (S5). Then, the processor 101 resumes the execution of the task A based on the restored context (and returns to S1 at the next interruption of the task A). Thus, the processor 101 switches and executes the tasks A and B by repeating the context storage and restoration. Such a switching method is sometimes called context switching.

Figure 6:
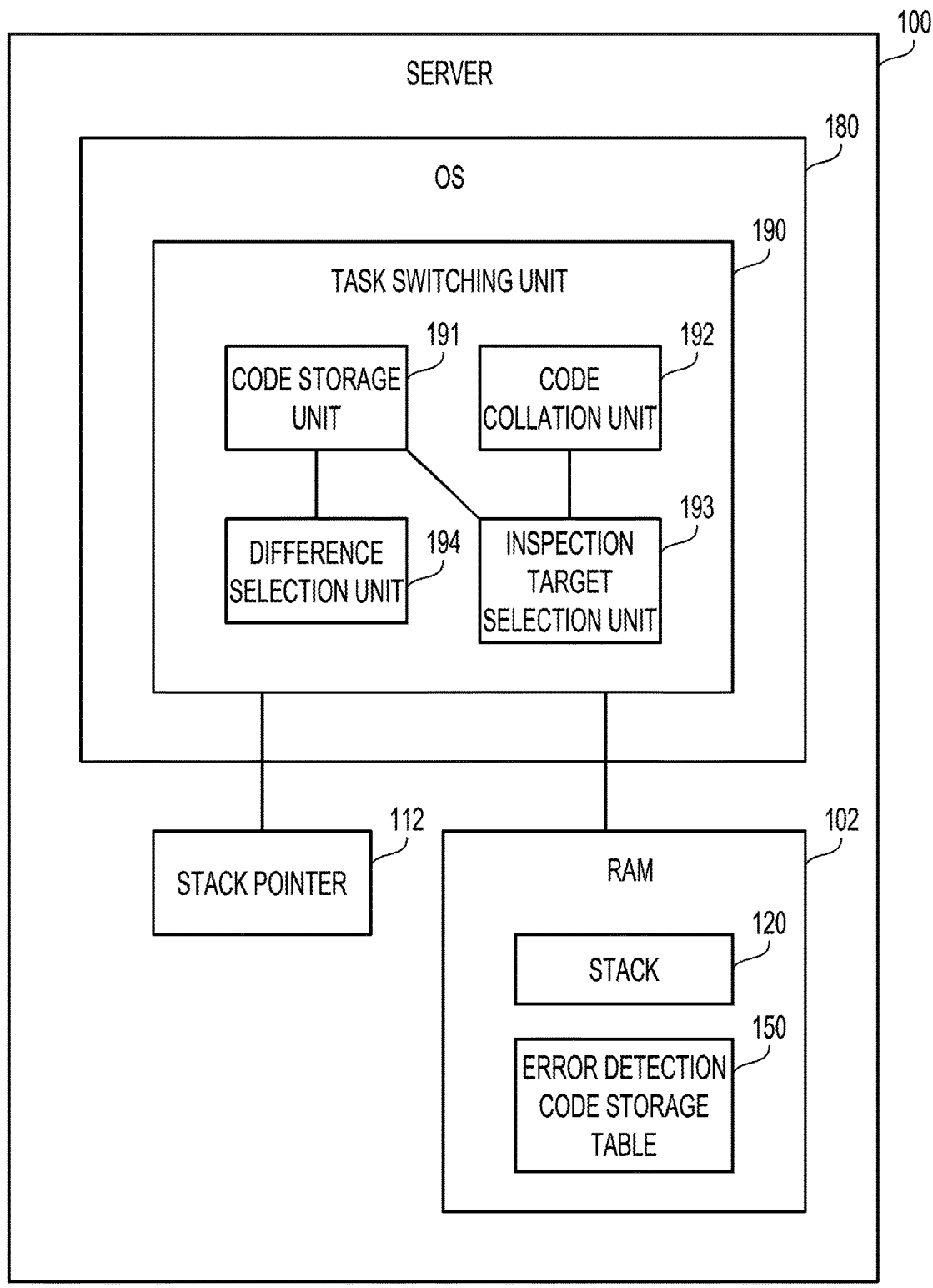
FIG. 6 is a diagram illustrating a functional configuration example of a server.

FIG. 6 is a view illustrating a functional configuration example of the server. The server 100 includes an OS 180. The OS 180 includes a task switching unit 190. The task switching unit 190 performs task execution scheduling and task switching. The task switching unit 190 has a function of inspecting the presence or absence of stack destruction. Specifically, the task switching unit 190 includes a code storage unit 191, a code collation unit 192, an inspection target selection unit 193, and a difference selection unit 194.

The code storage unit 191, the code collation unit 192, the inspection target selection unit 193, and the difference selection unit 194 are implemented by the processor 101 that executes a predetermined program stored in the RAM 102 (stack destruction detection program). In the following, each unit will be described mainly with the task A. However, the same processing is performed for other tasks including the task B.

When the execution of task A is interrupted, the code storage unit 191 generates an error detection code for a used area of the stack 120 for the task A and stores the generated error detection code in the error detection code storage table 150. When the execution of the task A is resumed, the code collation table 192 generates an error detection code for a used area of the stack 120 for the task A and collates the generated error detection code with the error detection code stored in the error detection code storage table 150 to detect stack destruction.

When the execution of the task A is interrupted, the inspection target selection unit 193 provides the head address of the used area of the stack 120 to the code storage unit 191 based on the stack pointer 112. When the execution of the task A is resumed, the inspection target selection unit 193 provides the head address of the used area of the stack 120 to the code collation unit 192 based on the stack pointer 112.

When the execution of the task A is interrupted, the difference selection unit 194 provides a differential area from the previous inspection time of stack destruction, of the memory area of the stack 120, to the code storage unit 191. The differential area is an error detection code generation target in the code storage unit 191.

Figure 7:
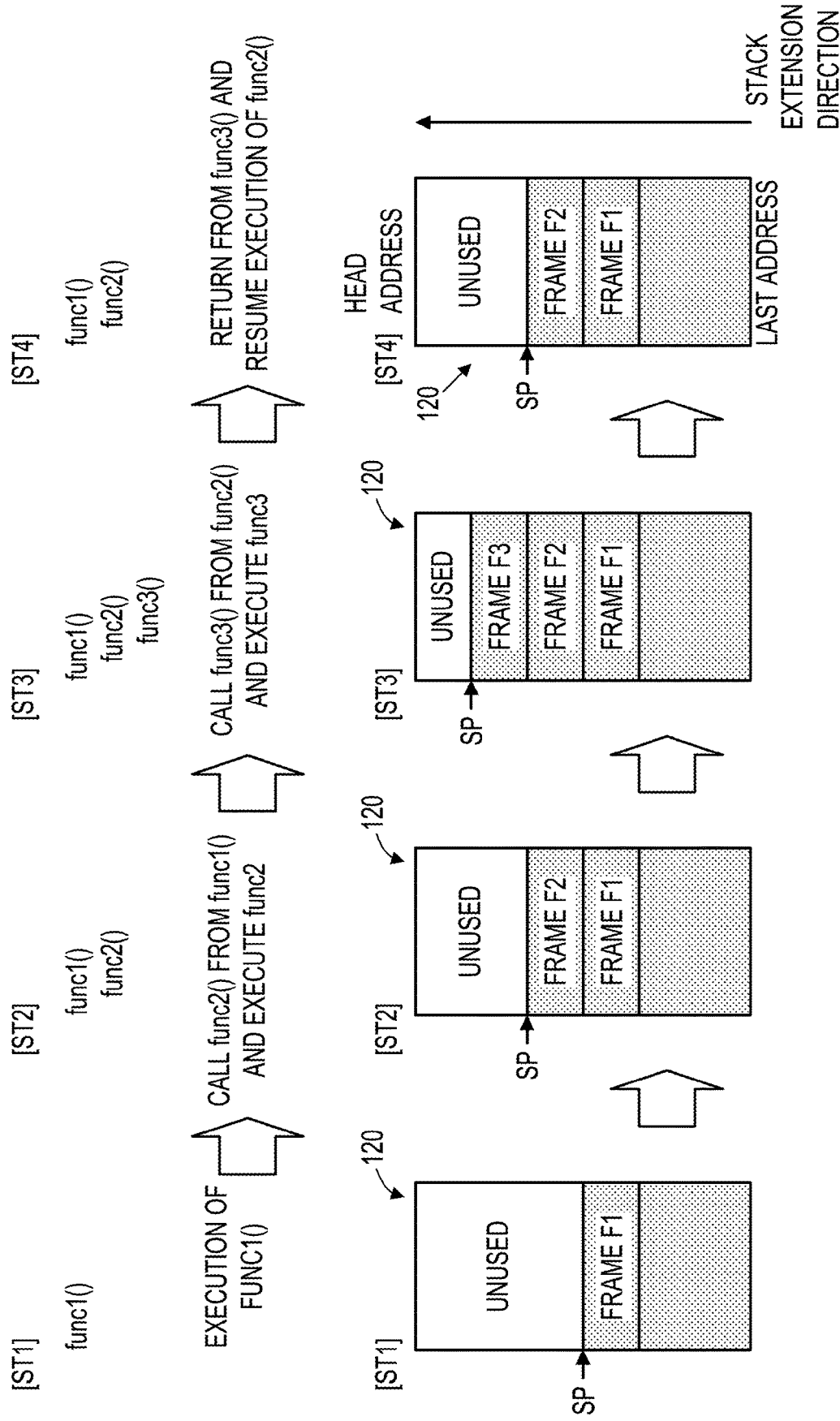
FIG. 7 is a view illustrating an example of a change in stack use amount for a program processing flow.

FIG. 7 is a view illustrating an example of a change in stack use amount for a program processing flow. For example, the task A includes functions fund., func2, and func3. Here, in the figure, the function is expressed as "func1( )". For example, the function func1 calls the function func2. The function func2 calls the function func3.

First, the server 100 executes the function fund. (ST1). A stack frame F1 is allocated to the function func1. The server 100 adds the stack frame F1 to the stack 120 based on the stack pointer 112 of the stack 120 (abbreviated as SP (Stack Pointer) in the figure). Here, in the figure, "stack frame F1" is abbreviated simply as "frame F1". In addition, in the figure, the head address of the stack 120 is indicated on the upper side and the last address of the stack 120 is indicated on the lower side. In this case, the direction of extension (growth) of the stack (the direction in which a stack frame is added) is the direction from the lower side to the upper side in the figure. The stack pointer 112 after adding the stack frame F1 indicates the head address of the stack frame F1. An area of the stack 120 represented by an address smaller than the stack pointer 112 is an unused area.

Next, the server 100 calls the function func2 from the function func1 and executes the function func2 (ST2). A stack frame F2 is allocated to the function func2. The server 100 adds the stack frame F2 to the stack 120 based on the stack pointer 112. The stack pointer 112 after adding the stack frame F2 indicates the head address of the stack frame F2.

Next, the server 100 calls the function func3 from the function func2 and executes the function func3 (ST3). A stack frame F3 is allocated to the function func3. The server 100 adds the stack frame F3 to the stack 120 based on the stack pointer 112. The stack pointer 112 after adding the stack frame F3 indicates the head address of the stack frame F3.

Further, the server 100 returns from the function func3 and resumes the execution of the function func2 (ST4). Based on the stack pointer 112, the server 100 removes the stack frame F3 allocated to the function func3 from the stack 120. The stack pointer 112 after removing the stack frame F3 indicates the head address of the stack frame F2.

In this way, the stack frame is pushed or popped on the stack 120 in the order of LIFO according to the function call. The inspection target selection unit 193 takes a used area in the stack 120 as an inspection target of stack destruction and does not take an unused area as an inspection target of stack destruction. This is because taking an unused area as an inspection target of stack destruction increases an overhead due to wasteful inspection processing. Based on the stack pointer 112, the inspection target selection unit 193 determines an address range of the inspection target of stack destruction in the stack 120.

Figure 8:
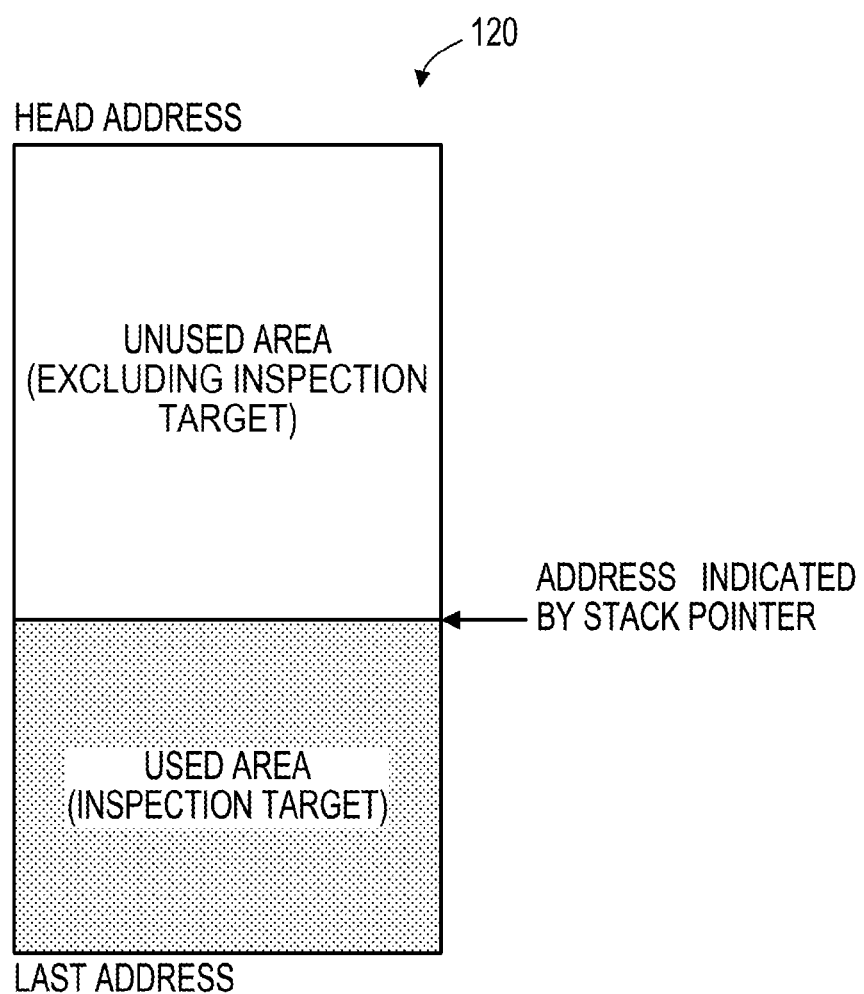
FIG. 8 is a view illustrating an example of an inspection target range of a stack area.

FIG. 8 is a view illustrating an example of an inspection target range of the stack area. As described above, the stack pointer 112 indicates the head address of the last added stack frame among the stack frames existing in the stack 120. Therefore, the inspection target selection unit 193 determines that a range represented by addresses smaller than the stack pointer 112 in the stack 120 is an unused area, and excludes such a range from the inspection target of stack destruction. In addition, the inspection target selection unit 193 determines that a range represented by the stack pointer 112 and addresses larger than the stack pointer 112 in the stack 120 is a used area, and takes such a range as the inspection target of stack destruction.

Figure 9:
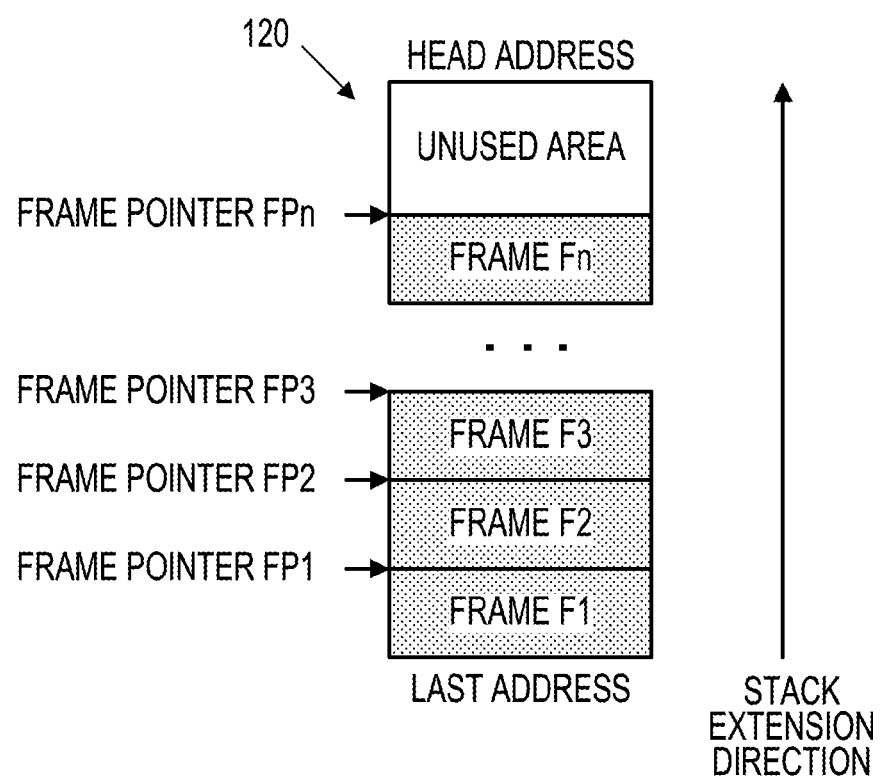
FIG. 9 is a view illustrating an example of a frame pointer.

FIG. 9 is a view illustrating an example of a frame pointer. For example, the stack 120 includes stack frames F1, F2, F3, . . . , Fn (n is a natural number) from the last address toward the head address. In the stack 120, areas other than the stack frames F1, F2, F3, . . . , Fn are unused areas. Addresses of the stack frames F1, F2, F3, . . . , Fn are indicated by frame pointers FP1, FP2, FP3, . . . , FPn, respectively. For example, the frame pointer FP1 indicates the head address of the stack frame F1. For example, the frame pointer FP2 indicates the head address of the stack frame F2. For example, the frame pointer FP3 indicates the head address of the stack frame F3. For example, the frame pointer FPn indicates the head address of the stack frame Fn. In this case, the frame pointer FPn corresponds to the address indicated by the stack pointer 112.

For example, a stack frame stores a frame pointer indicating the immediately preceding stack frame at a predetermined position. Specifically, the stack frame F2 includes the frame pointer FP1. The stack frame F3 includes the frame pointer FP2. The stack frame Fn includes the frame pointer FP(n−1) indicating the stack frame F(n−1).

FIG. 10 is a view illustrating an example of the error detection code storage table. The error detection code storage table 150 is stored in the RAM 102. The error detection code storage table 150 holds information on the task A. For other tasks including the task B, the error detection code storage table 150 is also set for each task. The error detection code storage table 150 includes items of an entry number, an error detection code, and a frame pointer.

Identification numbers of records of the error detection code storage table 150 (referred to as entries) are registered in the item of entry number. Error detection codes calculated for the stack frames are registered in the item of error detection code. Frame pointers indicating the corresponding stack frames are registered in the item of frame pointer.

Here, in the error detection code storage table 150, an entry having a larger entry number is referred to as an upper entry. An entry having a larger entry number has a smaller value (address) indicated by a frame pointer. In addition, in the error detection code storage table 150, an entry having a smaller entry number is referred to as a lower entry. An entry having a smaller entry number has a larger value (address) indicated by a frame pointer.

For example, the error detection code storage table 150 includes an entry with an entry number "n", an error detection code "code(n)", and a frame pointer "FPn". This entry indicates that an error detection code acquired for the stack frame Fn of the entry number "n" and the frame pointer FPn is "code (n)".

Similarly to other stack frames in the stack 120, error detection codes are registered in the error detection code storage table 150. Next, the procedure of inspection of stack destruction by the server 100 will be described. The task switching unit 190 starts the following procedure at a timing of executing the context switching.

Figure 11:
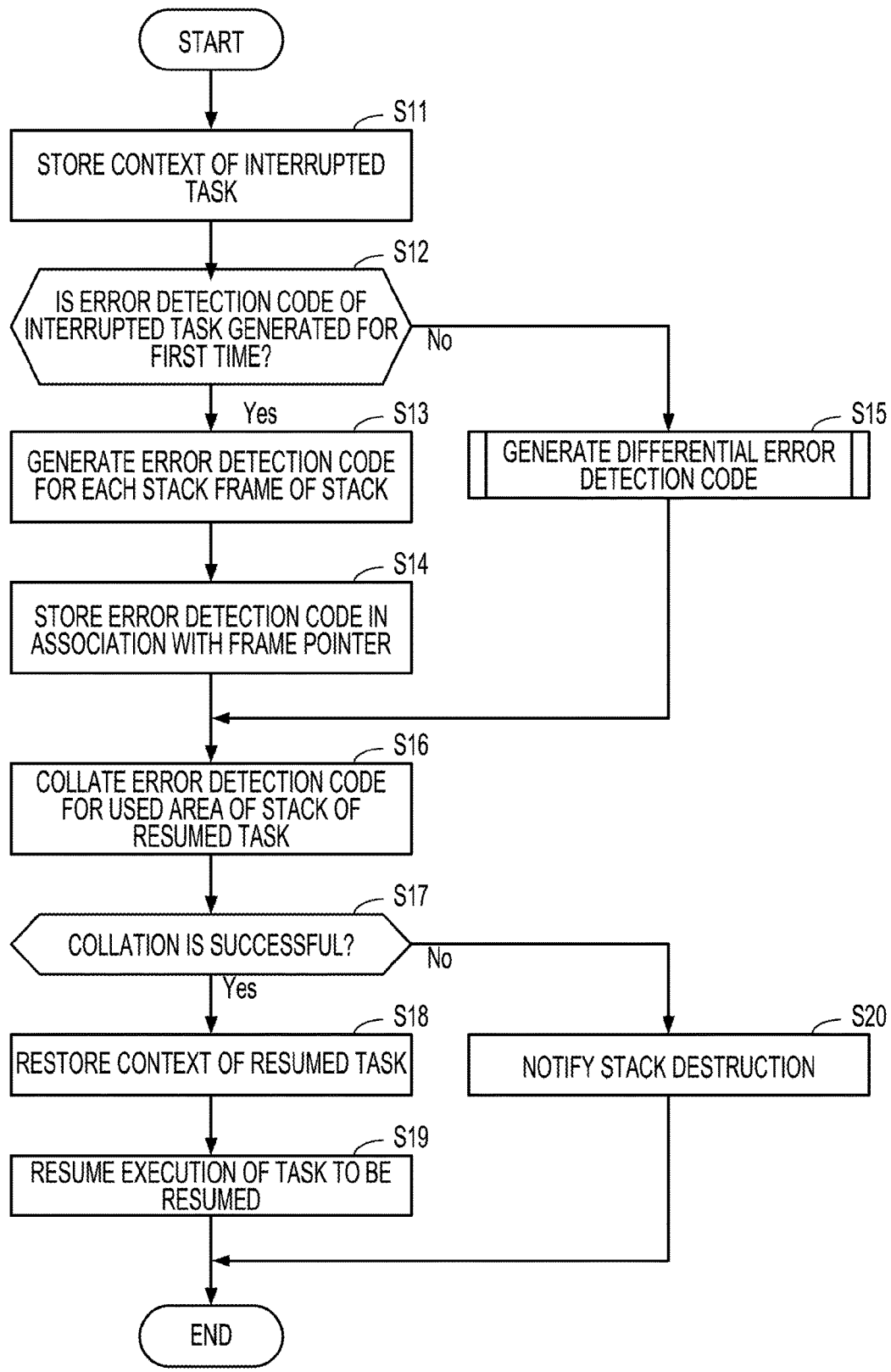
FIG. 11 is a flowchart illustrating an example of inspection of stack destruction.

FIG. 11 is a flowchart illustrating an example of inspection of stack destruction. Hereinafter, the process illustrated in FIG. 11 will be described.

(S11) The task switching unit 190 stores the context of an interrupted task (in this example, the task A).

(S12) The code storage unit 191 determines whether an error detection code of the interrupted task A is generated for the first time. When it is determined that the error detection code of the interrupted task A is generated for the first time, the code storage unit 191 advances the process to S13. When it is determined that the error detection code of the interrupted task A is not generated for the first time, the code storage unit 191 advances the process to S15. For example, when the error detection code storage table 150 for the task A has not been generated, the code storage unit 191 determines that the error detection code of the task A is generated for the first time. In the meantime, when the error detection code storage table 150 for the task A has been generated, the code storage unit 191 determines that the error detection code of the task A is not generated for the first time.

(S13) The inspection target selection unit 193 notifies the code storage unit 191 of an address indicated by the stack pointer 112. Based on the stack pointer 112 and each frame pointer, the code storage unit 191 generates an error detection code for each stack frame for all the stack frames existing in the stack 120. That is, the code storage unit 191 generates an error detection code string including an error detection code generated for each stack frame for the entire used areas of the stack 120.

(S14) The code storage unit 191 stores, in the RAM 102, the error detection code generated for the stack frame in association with the frame pointer of the stack frame. Specifically, the code storage unit 191 generates the error detection code storage table 150 for the task A and registers the frame pointer of the stack frame and the error detection code of the stack frame in the error detection code storage table 150. Then, the code storage unit 191 advances the process to S16.

(S15) The code storage unit 191 generates a differential error detection code. Details of the procedure of generating the differential error detection code will be described later. Then, the code storage unit 191 advances the process to S16.

(S16) The inspection target selection unit 193 notifies the code collation unit 192 of an address indicated by the stack pointer of a task to be resumed (in the example, the task B). The code collation table 192 collates the error detection code with respect to used areas of the stack 121 of the task B based on the address notified by the inspection target selection unit 193 and the error detection code storage table of the task B to be resumed. The code collation unit 192 executes collation of the error detection code for each stack frame. Specifically, the code collation unit 192 generates an error detection code for each stack frame of the stack 121 and compares the generated error detection code with the error detection code stored in the error detection code storage table to determine whether the error detection codes match each other. When the error detection codes match each other for all the stack frames of the stack 121, the code collation unit 192 determines that the collation is successful and that no stack destruction has occurred in the stack 121. In the meantime, when the error detection codes do not match each other for at least one stack frame of the stack 121, the code collation unit 192 determines that the collation is unsuccessful and that stack destruction has occurred in the stack 121.

(S17) The code collation unit 192 determines whether the collation is successful. When the collation is determined to be successful, the code collation unit 192 advances the process to S18. When the collation is determined to be unsuccessful, the code collation unit 192 advances the process to S20.

(S18) The task switching unit 190 restores the context of the resumed task B.

(S19) Based on the restored context, the task switching unit 190 resumes the execution of the task B to be resumed. Then, the task switching unit 190 ends the process.

(S20) The task switching unit 190 notifies the user of the stack destruction. For example, the task switching unit 190 may notify the stack destruction by displaying on the display 11 a message indicating that the stack destruction has occurred. Alternatively, the task switching unit 190 may notify the stack destruction by sending a message indicating that the stack destruction has occurred to another computer via the network 14. At this case, the task switching unit 190 may include information, which indicates a stack frame in which the stack destruction is detected in the stack 121 information (e.g., an address of the stack frame, etc.), in the notification. Then, the task switching unit 190 ends the process.

Figure 12:
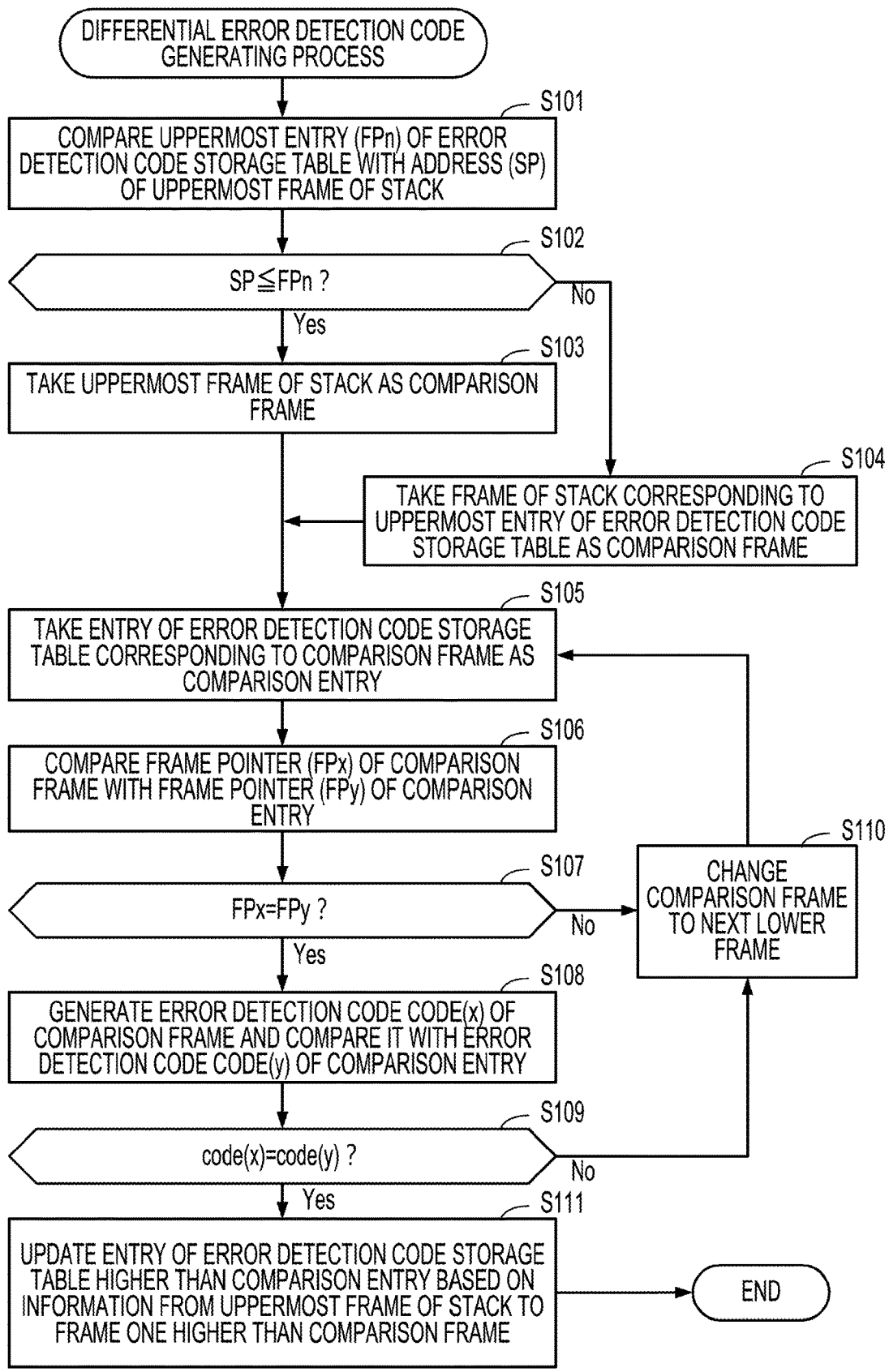
FIG. 12 is a flowchart illustrating an example of differential error detection code generation.

FIG. 12 is a flowchart illustrating an example of generation of a differential error detection code. Hereinafter, the process illustrated in FIG. 12 will be described. The procedure described below corresponds to S15 in FIG. 11.

(S101) The difference selection unit 194 compares the uppermost entry FPn of the error detection code storage table 150 with the address SP of the uppermost frame of the stack 120. Here, FPn is an address indicated by the frame pointer of the uppermost entry in the error detection code storage table 150. The address SP is an address indicated by the stack pointer 112. In some cases, a stack frame having a smaller address in the stack 120 may be referred to as an "upper frame" and a stack frame having a larger address may be referred to as a "lower frame".

(S102) The difference selection unit 194 determines whether or not SP≤FPn. When SP≤FPn, the difference selection unit 194 advances the process to S103. When SP>FPn, the difference selection unit 194 advances the process to S104.

(S103) The difference selection unit 194 takes the uppermost frame of the stack 120 as a comparison frame. Here, the "uppermost frame" is a stack frame indicated by the stack pointer 112 of the stack 120. Then, the difference selection unit 194 advances the process to S105.

(S104) The difference selection unit 194 takes a stack frame of the stack 120 corresponding to the uppermost entry in the error detection code storage table 150 as a comparison frame. Here, the difference selection unit 194 determines the "stack frame of the stack 120 corresponding to the uppermost entry" in the following manner. First, the difference selection unit 194 obtains an entry number k (k is an integer equal to or larger than 1) in the error detection code storage table 150. Then, the difference selection unit 194 determines the k-th stack frame counted upward from the lowermost frame in the stack 120 as a "stack frame of the stack 120 corresponding to the uppermost entry" in S104 and takes the k-th stack frame as a comparison frame. Then, the difference selection unit 194 advances the process to S105.

(S105) The difference selection unit 194 takes an entry of the error detection code storage table 150 corresponding to the comparison frame as a comparison entry. Here, the difference selection unit 194 determines the "entry of the error detection code storage table 150 corresponding to the comparison frame" in the following manner. First, the difference selection unit 194 finds the number m of stack frames lower than the comparison frame (m is an integer equal to or larger than 0) by tracing the frame pointer of the stack 120. Then, the difference selection unit 194 determines the (m+1)-th entry counted upward from the lowermost entry in the error detection code storage table 150 as an "entry of the error detection code storage table 150 corresponding to the comparison frame" in S105 and takes the (m+1)-th entry as a comparison entry.

(S106) The difference selection unit 194 compares a frame pointer FPx of the comparison frame with a frame pointer FPy of the comparison entry.

(S107) The difference selection unit 194 determines whether or not FPx=FPy. When FPx=FPy, the difference selection unit 194 advances the process to S108. When FPx≠FPy, the difference selection unit 194 advances the process to S110.

(S108) The difference selection unit 194 generates an error detection code code(x) of the comparison frame and compares the error detection code code(x) with an error detection code code(y) of the comparison entry.

(S109) The difference selection unit 194 determines whether or not code(x)=code(y). When code(x)=code(y), the difference selection unit 194 advances the process to S111. When code(x)≠code(y), the difference selection unit 194 advances the process to S110.

(S110) The difference selection unit 194 changes the comparison frame to the next lower stack frame (the stack frame having an address larger than the current comparison frame). Then, the difference selection unit 194 advances the process to S105.

(S111) The difference selection unit 194 notifies the code storage unit 191 so as to generate an error detection code for the stack frame higher than the comparison frame. In accordance with the notification from the difference selection unit 194, the code storage unit 191 updates the entry of the error detection code storage table 150 higher than the comparison entry based on information from the uppermost frame of the stack 120 (the uppermost stack frame) to the comparison frame. That is, the code storage unit 191 generates an error detection code for each stack frame from the uppermost frame of the stack 120 to a next higher stack frame to the comparison frame, and updates a corresponding entry in the error detection code storage table 150 with the generated error detection code. That is, the code storage unit 191 generates an error detection code string including an error detection code generated for each stack frame with respect to some used areas of the stack 120 (difference areas from the previous ones). The code storage unit 191 may not generate an error detection code in S111 for the stack frame on which the error detection code has already been generated by executing step S108, and may use the error detection code generated in S108. Then, the code storage unit 191 ends the process.

In this manner, the difference selection unit 194 collates the first error detection code for each stack frame (partial area) included in the first error detection code string acquired at the previous execution interruption of the task A with the second error detection code for each stack frame at the current execution interruption of the task A for each stack frame in the ascending order of addresses of the stack frame. The difference selection unit 194 determines a stack frame corresponding to an address smaller than the address of the stack frame in which the first error detection code and the second error detection code first match each other as a difference between the previous stack frame and the current stack frame. As a result, it is possible to appropriately determine the stack frame whose content has been changed from the previous stack frame. Then, it is possible to speed up the process of determining a differential stack frame without determining whether to change all the stack frames of the stacks 120.

In addition, the difference selection unit 194 acquires a second error detection code string for the current used area of the stack 120 by performing at least one of the replacement of some codes of the first error detection code string with codes included in the differential error detection code string and the addition of the codes included in the differential error detection code string to the first error detection code string. As a result, in order to generate the latest error detection code string for the stack 120, it is possible to speed up the process of generating the latest error detection code string, rather than generating an error detection code string for all the stack frames of the stack 120.

Further, based on the stack pointer 112, the difference selection unit 194 determines a first partial area corresponding to the first address among the used partial areas belonging to the stack 120. The difference selection unit 194 determines a second used partial area corresponding to a second address larger than the first address based on the frame pointer included in the determined first partial area. Thus, based on the stack pointer 112 or the frame pointer used to use the stack 120, it is possible to efficiently determine an error detection code generation target portion and an error detection code collation target portion in the stack 120.

Here, when all the stack frames of the stack 120 have already been processed in S110, there may be a case where no next lower stack frame to the comparison frame exists. In this case, the difference selection unit 194 notifies the code storage unit 191 so as to generate an error detection code for all the stack frames existing in the stack 120. Then, the code storage unit 191 generates an error detection code for each stack frame with respect to all the stack frames existing in the stack 120, updates each entry of the error detection code storage table 150, and ends the process. However, even in this case, when there is a stack frame in which the error detection code has been already generated in S108, the code storage unit 191 may not generate the error detection code for the corresponding stack frame and may use the error detection code generated in S108.

The reason for comparing the frame pointers FPx and FPy in S107 is that there is a high possibility that the frame pointer has been changed when the comparison frame is replaced by a stack frame of a function different from that in the previous inspection. In this case, the previous error detection code may not be used, which requires regeneration this time.

Figure 13:
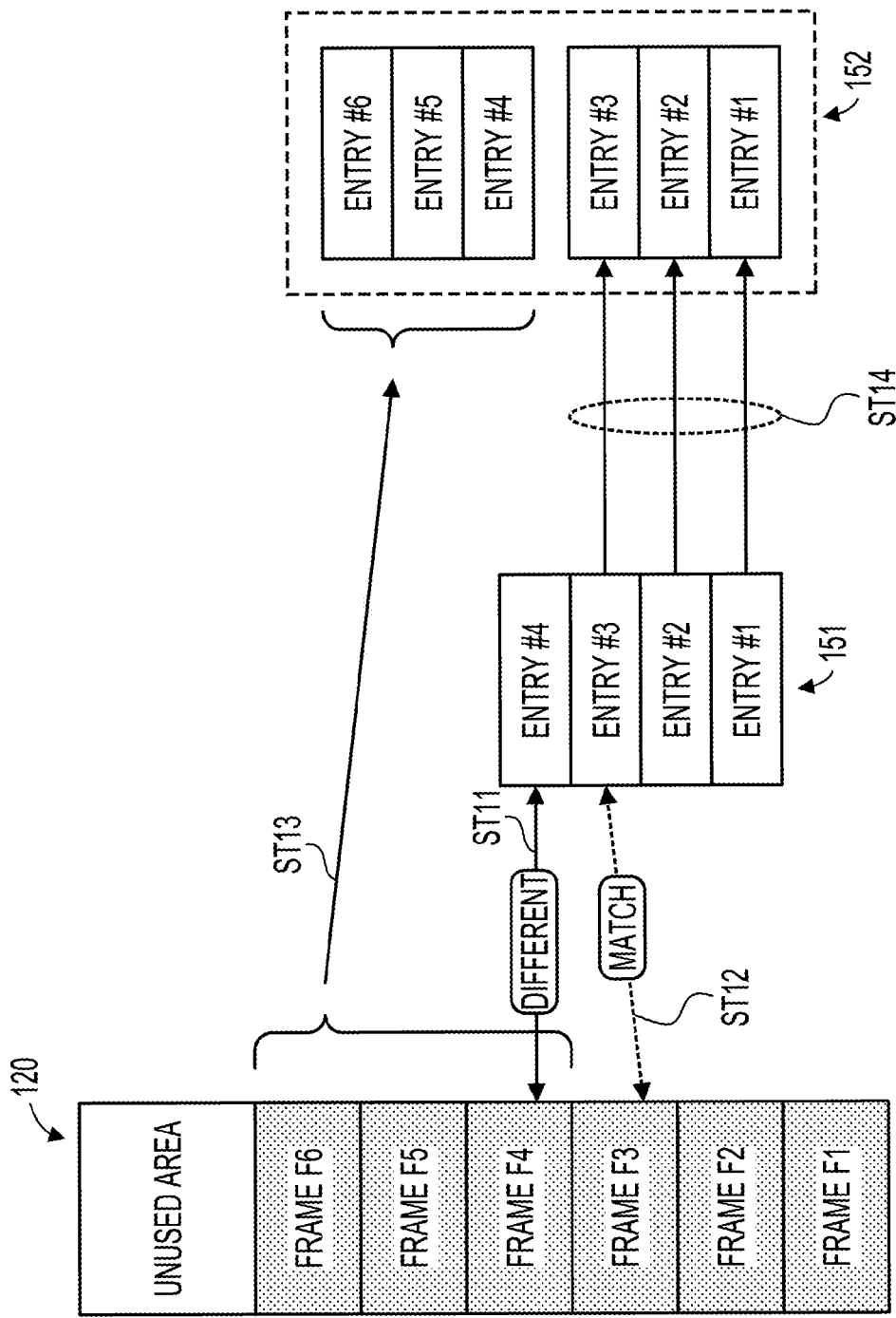
FIG. 13 is a view illustrating an example (part 1) of update of an error detection code storage table.

Next, a specific example of a method of updating an existing error detection code by a differential error detection code will be described. FIG. 13 is a view illustrating an example of update of the error detection code storage table. A case is assumed where the execution of the task A is interrupted as the task is switched. For example, at the timing of interruption of the task A, the stack 120 includes stack frames F1, F2, F3, F4, F5, and F6 in order from the last address to the head address. Further, the stack 120 includes an unused area. An error detection code storage table 151 is an error detection code storage table before the update corresponding to the task A. An error detection code storage table 152 is an error detection code storage table after the update corresponding to the task A.

For example, at the timing of interruption of the task A, the error detection code storage table 151 includes four entries #1, #2, #3, and #4. In this case, first, the difference selection unit 194 compares the address FPn=FP4 of the uppermost entry in the error detection code storage table 151 (frame pointer) with the address SP=FP6 of the uppermost frame of the stack 120 (stack pointer). Since SP>FPn ("No" in S102), the difference selection unit 194 takes the stack frame of the stack 120 corresponding to the uppermost entry #4 of the error detection code storage table 151 as a comparison frame (S104). Specifically, the entry number k of the error detection code storage table 151 is 4. Then, the difference selection unit 194 takes the stack frame F4 of k=4 counted from the lowermost frame (stack frame F1) of the stack 120 as a comparison frame. The comparison entry is the entry #4 of the error detection code storage table 151.

Then, the difference selection unit 194 compares the frame pointer (FPx) of the stack frame F4 with the frame pointer (FPy) of the entry #4 of the error detection code storage table 151. It is assumed that both match each other (FPx=FPy). The difference selection unit 194 collates the error detection code recorded in the entry #4 of the error detection code storage table 151 with the error detection code regenerated based on the stack frame F4. It is assumed that these two error detection codes are different from each other (ST11).

Next, the difference selection unit 194 changes the comparison frame to the next lower stack frame F3. The comparison entry is the entry #3 of the error detection code storage table 151. The difference selection unit 194 compares the frame pointer (FPx) of the stack frame F3 with the frame pointer (FPy) of the entry #3 of the error detection code storage table 151. It is assumed that both match each other (FPx=FPy). The difference selection unit 194 collates the error detection code recorded in the entry #3 of the error detection code storage table 151 with the error detection code regenerated based on the stack frame F3. It is assumed that these two error detection codes match each other (ST12).

Thus, the code storage unit 191 updates the entry of the error detection code storage table 151, which is higher than the entry #3 as the comparison entry, based on information from the uppermost frame (stack frame F6) of the stack 120 to the next higher stack frame F4 to the comparison frame. That is, the code storage unit 191 generates a differential error detection code for each of the stack frames F4, F5, and F6, and updates the error detection code storage table 151 (ST13). As a result, an error detection code of the entry #4 of the error detection code storage table 151 is updated and entries #5 and #6 are added to the error detection code storage table 151. The code storage unit 191 reuses the entry #3 that is determined to be equal to the error detection code regenerated for the stack frame F3, and the entries #2 and #1 lower than the entry #3 without creating an error detection code (ST14).

The error detection code storage table 152 is the updated error detection code storage table 151. The entries #1, #2, and #3 of the error detection code storage table 152 are reused entries. The entry #4 of the error detection code storage table 152 is an entry changed this time. The entries #5 and #6 of the error detection code storage table 152 are entries added this time.

Figure 14:
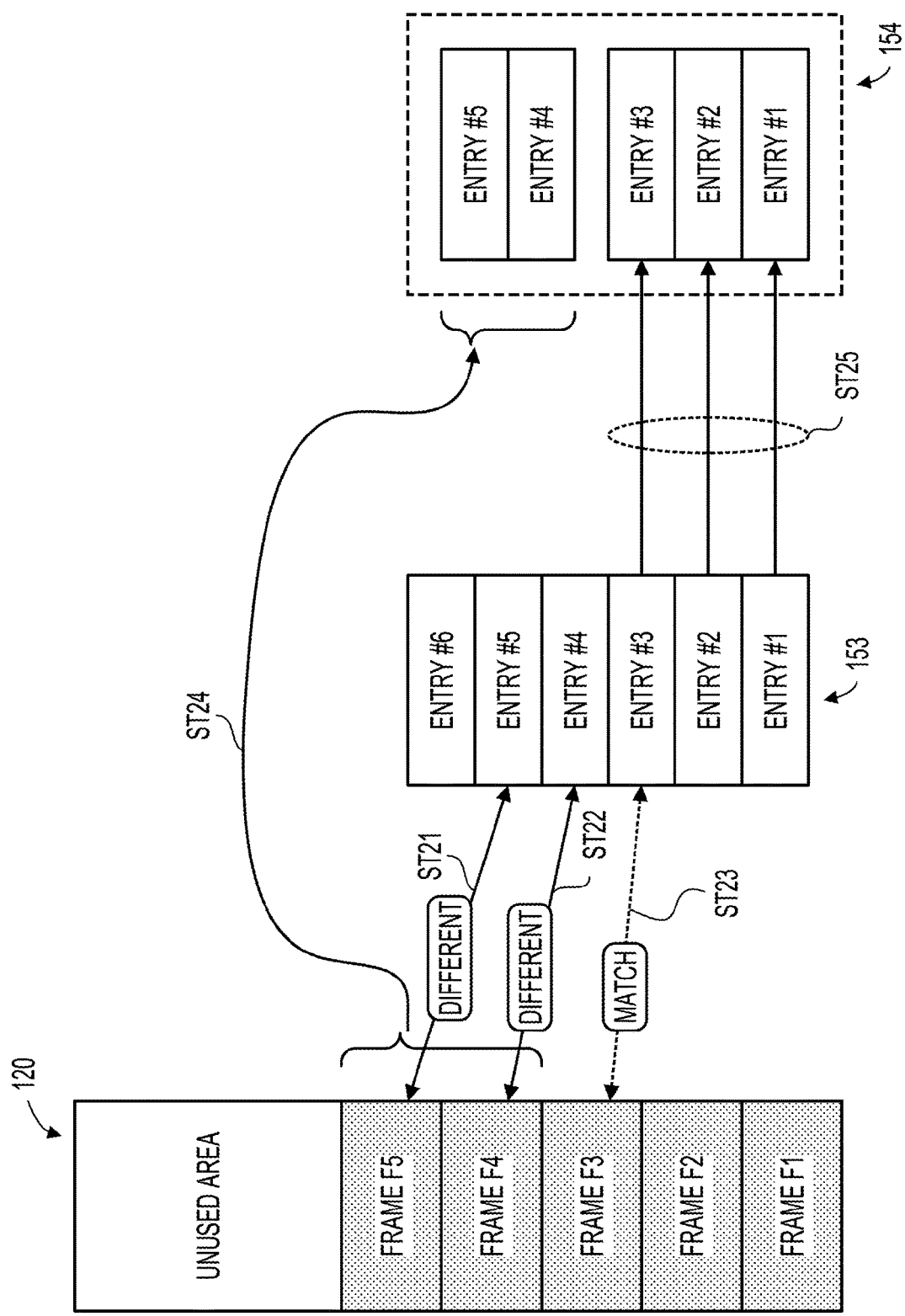
FIG. 14 is a view illustrating an example (part 2) of update of an error detection code storage table.

In this way, the code storage unit 191 generates a differential error detection code and reuses the previous error detection code to obtain the latest error detection code string for a used area of the stack 120. FIG. 14 is a view illustrating another example of update of the error detection code storage table. Subsequently, a case is assumed where the execution of the task A is interrupted as the task is switched. For example, at the timing of interruption of the task A, the stack 120 includes stack frames F1, F2, F3, F4, and F5 in order from the last address to the head address. The stack 120 includes an unused area. An error detection code storage table 153 is an error detection code storage table before update corresponding to the task A. An error detection code storage table 154 is an error detection code storage table after update corresponding to the task A.

For example, at the timing of interruption of the task A, the error detection code storage table 153 includes six entries #1, #2, #3, #4, #5, and #6. In this case, first, the difference selection unit 194 compares the address FPn=FP6 of the uppermost entry of the error detection code storage table 153 with the address SP=FP5 of the uppermost frame of the stack 120. Since SP≤FPn ("Yes" in S102), the difference selection unit 194 takes the uppermost stack frame F5 of the stack 120 as a comparison frame (S103).

By following the frame pointer, the difference selection unit 194 determines that there are four stack frames F1, F2, F3, and F4 below the stack frame F5, and sets m=4. Then, the difference selection unit 194 takes the (m+1)-th (fifth) entry #5 counted from the lowermost entry of the error detection code storage table 153 as a comparison entry (S105).

Then, the difference selection unit 194 compares the frame pointer (FPx) of the stack frame F5 with the frame pointer (FPy) of the entry #5 of the error detection code storage table 153. It is assumed that both match each other (FPx=FPy). In addition, the difference selection unit 194 compares the error detection code recorded in the entry #5 of the error detection code storage table 153 with the error detection code regenerated based on the stack frame F5. It is assumed that these two error detection codes are different from each other (ST 21).

Next, the difference selection unit 194 changes the comparison frame to the next lower stack frame F4. The comparison entry is the entry #4 of the error detection code storage table 153. The difference selection unit 194 compares the frame pointer (FPx) of the stack frame F4 with the frame pointer (FPy) of the entry #4 of the error detection code storage table 153. It is assumed that both match each other (FPx=FPy). In addition, the difference selection unit 194 collates the error detection code recorded in the entry #4 of the error detection code storage table 153 with the error detection code regenerated based on the stack frame F4. It is assumed that these two error detection codes are different from each other (ST22).

Next, the difference selection unit 194 changes the comparison frame to the next lower stack frame F3. The comparison entry is the entry #3 of the error detection code storage table 153. The difference selection unit 194 compares the frame pointer (FPx) of the stack frame F3 with the frame pointer (FPy) of the entry #3 of the error detection code storage table 153. It is assumed that both match each other (FPx=FPy). Further, the difference selection unit 194 compares the error detection code recorded in the entry #3 of the error detection code storage table 153 with the error detection code regenerated based on the stack frame F3. It is assumed that these two error detection codes match each other (ST23).

In this way, the code storage unit 191 updates the entry of the error detection code storage table 153, which is higher than the entry #3 as the comparison entry, based on information from the uppermost frame (stack frame F5) of the stack 120 to the next higher stack frame F4 to the comparison frame. That is, the code storage unit 191 generates a differential error detection code for each of the stack frames F4 and F5, and updates the error detection code storage table 153 (ST24). As a result, the error detection codes of the entries #4 and #5 of the error detection code storage table 153 are updated and the entry #6 is deleted.

In addition, the code storage unit 191 reuses the entry #3 that is determined to be equal to the error detection code regenerated for the stack frame F3, and the entries #2 and #1 lower than the entry #3 without creating an error detection code (ST25).

The error detection code storage table 154 is the updated error detection code storage table 153. The entries #1, #2, and #3 of the error detection code storage table 154 are reused entries. The entries #4 and #5 of the error detection code storage table 154 are entries changed this time. The entries #4 and #5 of the error detection code storage table 154 are entries added this time.

Figure 15:
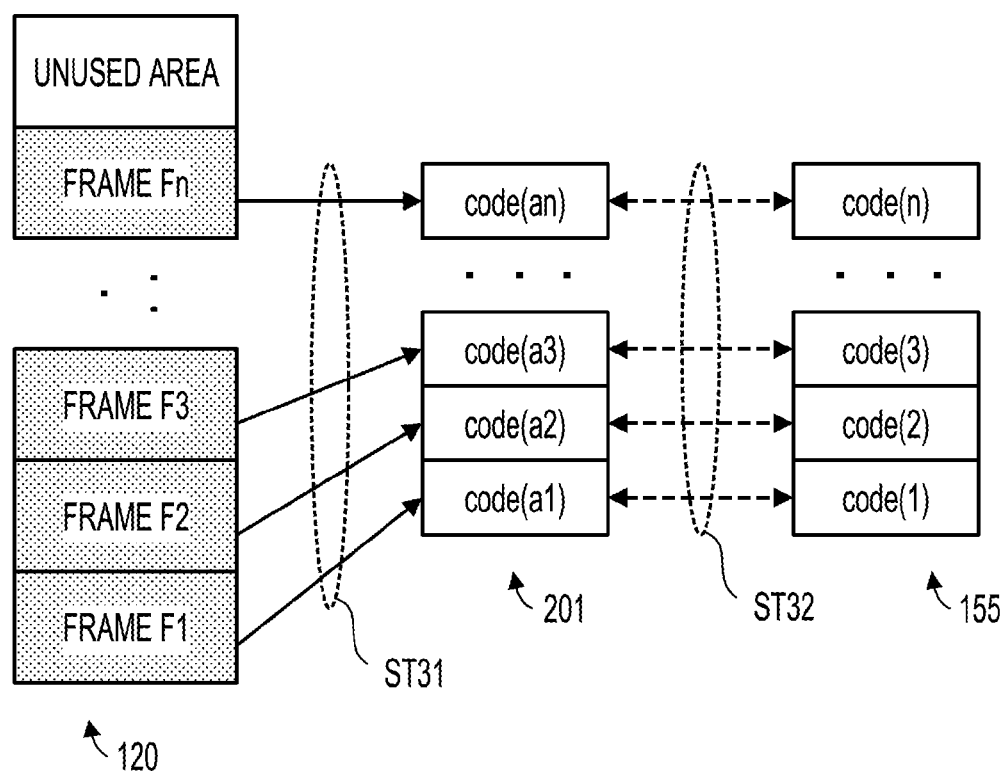
FIG. 15 is a view illustrating an example of collation of error detection codes.

In this way, the code storage unit 191 generates a differential error detection code and reuses the previous error detection code to obtain the latest error detection code string for a used area of the stack 120. FIG. 15 is a view illustrating an example of collation of error detection codes. A case is assumed where the execution of the interrupted task A is resumed as the task is switched. An error detection code storage table 155 is a table in which an error detection code string at the previous interruption of the task A is recorded.

The code collation unit 192 receives a notification of the head address (stack pointer 112) of the stack frame Fn in the stack 120 from the inspection target selection unit 193. The code collation unit 192 recognizes a stack frame lower than the stack frame Fn and the stack frame Fn as a used area. The code collation unit 192 traces an address indicated by the stack pointer 112 and the frame pointer to identify each of the stack frames F1, F2, F3, . . . lower than the stack frame Fn. The code collation unit 192 generates an error detection code (an error detection code string 201 for collation) for each of the stack frames F1, F2, F3, . . . , Fn (ST31). The error detection code string 201 includes error detection codes code(a1), code(a2), code(a3), . . . , code(an). The error detection code code(a1) is an error detection code generated based on the stack frame F1. The error detection code code(a2) is an error detection code generated based on the stack frame F2. The error detection code code(a3) is an error detection code generated based on the stack frame F3. The error detection code code(an) is an error detection code generated based on the stack frame Fn.

The code collation unit 192 collates the regenerated error detection code string 201 with the error detection code string recorded in the error detection code storage table 155 for each stack frame (ST32). For example, the code collation unit 192 collates the regenerated error detection code code (a1) with the error detection code code(1) recorded in the error detection code storage table 155 for the stack frame F1. Similarly, the code collation unit 192 collates the regenerated error detection codes code(a2), code(a3), . . . , code(an) with the error detection codes code(2), code(3), . . . , code(n) recorded in the error detection code storage table 155 for the stack frames F2, F3, . . . , Fn.

When all the sets of all error detection codes match each other by the collation, the code collation unit 192 determines that no stack destruction has occurred and resumes the execution of the task A. In the meantime, when at least one set of error detection codes does not match by the collation, the code collation table 192 determines that stack destruction has occurred, stops the resumption of the execution of the task A, and notifies the user that the stack destruction has occurred.

Then, the code collation unit 192 may reduce the amount of processing accompanying the inspection of the stack destruction by reducing an inspection target range in the stack 120. The following is the case. FIGS. 16A and 16B are views illustrating examples of an inspection target range. FIG. 16A illustrates an example in which a used area in the stack 120 is taken as an inspection target and an unused area is excluded from the inspection target. FIG. 16B illustrates an example in which all areas of the stack 120 are taken as inspection targets.

In FIG. 16A, the stack 120 is divided into areas R1, R2, and R3. The area R1 is a used area where there is no change in the stored data from the previous inspection (i.e., previous interruption of the task A or resumption of the task A). For a stack frame belonging to the area R1, an error detection code at the previous inspection may be reused for the current inspection. Further, the area R1 is an inspection target of stack destruction due to the collation of an error detection code.

The area R2 is a used area and is also an area where the data stored since the previous inspection is rewritten. For a stack frame belonging to the area R2, an error detection code at the previous inspection may not be reused and it is necessary to generate an error detection code when the task A is interrupted. In addition, the area R2 is an inspection target of stack destruction due to collation of an error detection code.

The area R3 is an unused area. The area R3 is excluded from an inspection target of stack destruction due to collation of an error detection code. That is, when the execution of the task A is interrupted, the server 100 does not update an error detection code for an area other than a difference stack frame (a used partial area) in the stack 120. In addition, when the execution of the task A is resumed, the server 100 does not generate and collate an error detection code for an unused area in the stack 120.

For example, it is assumed that the ratio of size of the area R1 to the entire stack 120 is 0.2. It is also assumed that the ratio of size of the area R2 to the entire stack 120 is 0.4. It is also assumed that the ratio of size of the area R3 to the entire stack 120 is 0.4.

In the meantime, as illustrated in FIG. 16B, it is conceivable that the entire areas of the stack 120 is always taken as an inspection target of stack destruction. Here, assuming that the entire size of the stack 120 is 1 and that the processing amount is proportional to the size of an area to be processed, a processing amount in the case of FIG. 16A may be roughly compared with a processing amount in the case of FIG. 16B.

For example, in the case of FIG. 16A, when the execution of the task A is interrupted, the code storage unit 191 generates an error detection code for the area R2 (processing amount of 0.4). In addition, when the execution of the task A is resumed, the code collation unit 192 generates and collates an error detection code for the area R2 (processing amount of 0.4). In this case, however, the processing amount is evaluated by grasping the generation and collation of an error detection code at the resumption of execution of the task A as one processing. Further, when the execution of the task A is resumed, the code collation unit 192 generates and collates an error detection code for the area R1 (processing amount of 0.2). In the case of FIG. 16A, a processing amount of 1 (=0.4+0.4+0.2) is generated in one set of execution interruption and execution resumption of the task A for inspection of stack destruction.

In the case of FIG. 16B, when the task A is executed, the code storage unit 191 generates an error detection code for the entire area of the stack 120 (processing amount of 1). In addition, when the execution of the task A is resumed, the code collation unit 192 generates and collates an error detection code for the entire area of the stack 120 (processing amount of 1). Therefore, in the case of FIG. 16B, a processing amount of 2 (=1+1) is generated in one set of execution interruption and execution resumption of the task A for inspection of stack destruction.

In comparison between the processing amount of 1 in the case of FIG. 16A and the processing amount of 2 in the case of FIG. 16B, the case of FIG. 16A (a case where only a used area is taken as an inspection target) is smaller in processing amount than the case of FIG. 16B (a case where the entire stack area is taken as an inspection target).

In the processing amount comparison, it is also possible to evaluate the processing amount by grasping the generation and collation of an error detection code at the resumption of execution of the task A as a separate processing. In that case, the processing amount for inspection of stack destruction in the case of FIG. 16A is 1.6 (=0.4+0.8+0.4) in that the processing amounts at the resumption of execution for the areas R2 and R3 are 0.8 (=0.4+0.4) and 0.4 (=0.2+0.2), respectively. In addition, the processing amount for inspection of stack destruction in the case of FIG. 16B is 3 (=1+1+1). Even when the processing amount is more strictly evaluated in this way, the case of FIG. 16A is smaller in processing amount than the case of FIG. 16B.

In this manner, the server 100 may reduce the processing amount for stack destruction inspection. As a result, a processing load associated with the task switching may be reduced and the task switching may be performed at a high speed. Particularly, in the server 100, the task switching is frequently performed under control of the OS 180. Therefore, reducing the processing load of task switching and speeding up the task switching contribute greatly to improving the performance of the server 100.

The information processing of the first embodiment may be implemented by causing the processing unit 1b to execute a program. The information processing of the second embodiment may be implemented by causing the processor 101 to execute a program. The program may be recorded on the computer-readable recording medium 13.

For example, by distributing the recording medium 13 that records the program, it is possible to distribute the program. Alternatively, the program may be stored in another computer and may be distributed via a network. For example, the computer may store (install) a program recorded on the recording medium 13 or a program received from another computer in a storage device such as the RAM 102 or the HDD 103, and may read and execute the program from the storage device.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
a memory configured to store a first string of error detection codes each corresponding to a used partial area of a stack area allocated to a program; and
a processor coupled to the memory and the processor configured to:
generate, when execution of the program is interrupted, a differential string of error detection codes each corresponding to a used partial area of a difference between used partial areas at the time of generating the first string of error detection codes and used partial areas at the interruption;
obtain a second string of error detection codes by reflecting the differential string of error detection codes to the first string of error detection codes stored in the memory;
generate, when the execution of the program is resumed, a third string of error detection codes each corresponding to a used partial area of the stack area at the resumption; and
detect stack destruction based on collation between the second string of error detection codes and the third string of error detection codes.

2. The information processing apparatus according to claim 1, wherein
the processor is configured to:
collate first error detection codes included in the first string of error detection codes with second error detection codes each corresponding to a used partial area at the interruption in order from a smaller address among addresses corresponding to partial areas of the stack area; and
determine, as the difference, partial areas corresponding to addresses smaller than an address of a partial area for which the first error detection code and the second error detection code first match each other.

3. The information processing apparatus according to claim 1, wherein
the processor is configured to acquire the second string of error detection codes by performing at least one of replacement of a code included in the first string of error detection codes with a code included in the differential string of error detection codes or an addition of a code included in the differential string of error detection codes to the first string of error detection codes.

4. The information processing apparatus according to claim 1, wherein
the processor is configured to:
determine, from among used partial areas of the stack area, a first partial area corresponding to a first address in accordance with a stack pointer; and
determine a second partial area corresponding to a second address larger than the first address in accordance with a frame pointer included in the first partial area.

5. The information processing apparatus according to claim 1, wherein the processor is configured to:
omit, at the interruption, update of error detection codes corresponding to the used partial areas of the stack area other than the difference; and
omit, at the resumption, generation and collation of error detection codes corresponding to unused partial areas of the stack area.

6. The information processing apparatus according to claim 1, wherein
the first string of error detection codes is a string of error detection codes corresponding to used partial areas of the stack area at a previous interruption of execution of the program.

7. The information processing apparatus according to claim 1, wherein
the processor is configured to interrupt execution of the program when an execution target is switched from the program to another program.

8. A non-transitory computer-readable recording medium having stored therein a first program that causes a computer to execute a process, the process comprising:
acquiring a first string of error detection codes each corresponding to a used partial area of a stack area allocated to a second program;
generating, when execution of the second program is interrupted, a differential string of error detection codes each corresponding to a used partial area of a difference between used partial areas at the time of generating the first string of error detection codes and used partial areas at the interruption;
obtaining a second string of error detection codes by reflecting the differential string of error detection codes to the first string of error detection codes stored in the memory;
generating, when the execution of the second program is resumed, a third string of error detection codes each corresponding to a used partial area of the stack area at the resumption; and
detecting stack destruction based on collation between the second string of error detection codes and the third string of error detection codes.

9. The non-transitory computer-readable recording medium according to claim 8, the process further comprising:
collating first error detection codes included in the first string of error detection codes with second error detection codes each corresponding to a used partial area at the interruption in order from a smaller address among addresses corresponding to partial areas of the stack area; and
determining, as the difference, partial areas corresponding to addresses smaller than an address of a partial area for which the first error detection code and the second error detection code first match each other.

10. The non-transitory computer-readable recording medium according to claim 8, the process further comprising
acquiring the second string of error detection codes by performing at least one of replacement of a code included in the first string of error detection codes with a code included in the differential string of error detection codes or an addition of a code included in the differential string of error detection codes to the first string of error detection codes.

11. The non-transitory computer-readable recording medium according to claim 8, the process further comprising:

determining, from among used partial areas of the stack area, a first partial area corresponding to a first address in accordance with a stack pointer; and determining a second partial area corresponding to a second address larger than the first address in accordance with a frame pointer included in the first partial area.

12. The non-transitory computer-readable recording medium according to claim 8, the process further comprising:

omitting, at the interruption, update of error detection codes corresponding to the used partial areas of the stack area other than the difference; and omitting, at the resumption, generation and collation of error detection codes corresponding to unused partial areas of the stack area.

13. The non-transitory computer-readable recording medium according to claim 8, wherein the first string of error detection codes is a string of error detection codes corresponding to used partial areas of the stack area at a previous interruption of execution of the second program.

14. The non-transitory computer-readable recording medium according to claim 8, the process further comprising interrupting execution of the second program when an execution target is switched from the second program to another program.

* * * * *